(12) United States Patent
Dalli et al.

(10) Patent No.: US 12,488,242 B2
(45) Date of Patent: **\*Dec. 2, 2025**

(54) METHOD FOR AN EXPLAINABLE AUTOENCODER AND AN EXPLAINABLE GENERATIVE ADVERSARIAL NETWORK

(71) Applicant: UMNAI Limited, Ta' Xbiex (MT)

(72) Inventors: Angelo Dalli, Floriana (MT); Mauro Pirrone, Kalkara (MT); Matthew Grech, San Gwann (MT)

(73) Assignee: UMNAI Limited, Ta' Xbiex (MT)

( \* ) Notice: Subject to any disclaimer, the term of this patent is extended or adjusted under 35 U.S.C. 154(b) by 0 days.

This patent is subject to a terminal disclaimer.

(21) Appl. No.: 18/596,992

(22) Filed: Mar. 6, 2024

(65) Prior Publication Data

US 2024/0249143 A1    Jul. 25, 2024

Related U.S. Application Data

(63) Continuation of application No. 17/527,726, filed on Nov. 16, 2021, now Pat. No. 11,948,083.

(60) Provisional application No. 63/114,109, filed on Nov. 16, 2020.

(51) Int. Cl.
    *G06N 3/08* (2023.01)

(52) U.S. Cl.
    CPC ..................... *G06N 3/08* (2013.01)

(58) Field of Classification Search
    CPC .......... G06N 3/08; G06N 5/045; G06N 20/00; G06N 5/048
    See application file for complete search history.

(56) References Cited

U.S. PATENT DOCUMENTS

| 10,783,401 B1* | 9/2020 | Jiang ...................... G06N 3/086 |
| 2014/0280193 A1 | 9/2014 | Cronin et al. |
| 2018/0197081 A1 | 7/2018 | Ji et al. |

(Continued)

FOREIGN PATENT DOCUMENTS

EP    3640814 A1    4/2020

OTHER PUBLICATIONS

Zhao et al. ("Learning Hierarchical Features from Deep Generative Models" Machine Learning, PMLR 70:4091-4099, 2017) (Year: 2017).*

(Continued)

*Primary Examiner* — Imad Kassim
(74) *Attorney, Agent, or Firm* — Maier & Maier, PLLC

(57) ABSTRACT

An exemplary embodiment provides an autoencoder which is explainable. An exemplary autoencoder may explain the degree to which each feature of the input attributed to the output of the system, which may be a compressed data representation. An exemplary embodiment may be used for classification, such as anomaly detection, as well as other scenarios where an autoencoder is input to another machine learning system or when an autoencoder is a component in an end-to-end deep learning architecture. An exemplary embodiment provides an explainable generative adversarial network that adds explainable generation, simulation and discrimination capabilities. The underlying architecture of an exemplary embodiment may be based on an explainable or interpretable neural network, allowing the underlying architecture to be a fully explainable white-box machine learning system.

20 Claims, 19 Drawing Sheets

(56) References Cited

U.S. PATENT DOCUMENTS

| | | | | |
|---|---|---|---|---|
| 2020/0187841 | A1* | 6/2020 | Ayyad | G06N 3/047 |
| 2021/0110254 | A1* | 4/2021 | Hoang | G06F 17/18 |
| 2021/0287141 | A1* | 9/2021 | Molloy | G06F 18/22 |
| 2021/0326723 | A1* | 10/2021 | Kumar | G06N 5/04 |

OTHER PUBLICATIONS

Tschannen et al ("Recent Advances in Autoencoder-Based Representation Learning", arXiv, NeurIPS 2018) (Year: 2018).*

Loyola-González et al ("Black-Box vs. White-Box: Understanding Their Advantages and Weaknesses From a Practical Point of View," in IEEE Access, vol. 7, pp. 154096-154113, 2019) (Year: 2019).*

Feng et al. ("Interpretable Partitioned Embedding for Customized Fashion Outfit Composition", Alibaba Group, 2017) (Year: 2017).*

Papernot et al. ("Practical Black-Box Attacks against Machine Learning", Association for Computing Machinery, pp. = {506-519}, 2017) (Year: 2017).*

Antwarg, L., Miller, R.M., Shapira, B. and Rokach, L., 2019, "Explaining anomalies detected by autoencoders using SHAP", ACM, arXiv preprint arXiv:1903.02407, 5 pages.

Bellini, V., Anelli, V.W., Di Noia, T. and Di Sciascio, E., Aug. 2017, "Auto-encoding user ratings via knowledge graphs in recommendation scenarios", DLRS 2017: Proceedings of the 2nd Workshop on Deep Learning for Recommender Systems, pp. 60-66, Abstract attached, 3 pages.

Denton, E., Chintala, S., Szlam, A. and Fergus, R., 2015, "Deep generative image models using a Laplacian pyramid of adversarial networks", arXiv preprint arXiv:1506.05751., 2 pages.

Gondara, L., Dec. 2016, "Medical image denoising using convolutional denoising autoencoders" In 2016 IEEE 16th international conference on data mining workshops (ICDMW) (pp. 241-246). IEEE., Abstract attached, 3 pages.

Goodfellow, I., Pouget-Abadie, J., Mirza, M., Xu, B., Warde-Farley, D., Ozair, S., Courville, A. and Bengio, Y., 2014. "Generative adversarial nets" Advances in neural information processing systems, 27., 9 pages.

Graves, L., Nagisetty, V., Scott, J. and Ganesh, V., Submitted on Feb. 24, 2020 (this version), latest version Oct. 26, 2020 (v2), "LogicGAN: Logic-guided Generative Adversarial Networks", arXiv e-prints, pp. arXiv-2002., 2 pages.

Hinton, G.E. and Salakhutdinov, R.R., 2006, "Reducing the dimensionality of data with neural networks" science, vol. 313(5786), pp. 504-507, Abstract attached, 3 pages.

Ho, J. and Ermon, S., 2016, "Generative adversarial imitation learning" Advances in neural information processing systems, 29, pp. 4565-4573, 9 pages.

Kingma, D.P. and Welling, M., 2013, "Auto-encoding variational bayes", arXiv preprint arXiv:1312.6114., 14 pages.

Kocaoglu, M., Snyder, C., Dimakis, A.G. and Vishwanath, S., 2017, "Causalgan: Learning causal implicit generative models with adversarial training" arXiv preprint arXiv:1709.02023., 37 pages.

Lundberg, S.M. and Lee, S.I., Dec. 2017, "A unified approach to interpreting model predictions" In Proceedings of the 31st international conference on neural information processing systems, pp. 4768-4777, 10 pages.

Mirza, M. and Osindero, S., 2014, "Conditional generative adversarial nets", arXiv preprint arXiv:1411.1784., 7 pages.

Nagisetty, V., Graves, L., Scott, J. and Ganesh, V., 2020, "xAI-GAN: Enhancing Generative Adversarial Networks via Explainable AI Systems", Association for the Advancement of Artificial Intelligence (www.aaai.org), 9 pages.

Nguyen, Q.P., Lim, K.W., Divakaran, D.M., Low, K.H. and Chan, M.C., Jun. 2019, "GEE: A gradient-based explainable variational autoencoder for network anomaly detection" In 2019 IEEE Conference on Communications and Network Security (CNS), pp. 91-99, IEEE., Abstract attached, 3 pages.

Qin, C. Wu, Y. Springerberg, J.T. Brock, A. Donahue, H. Lillicrap, T. and Kohli, P. "Training Generative Adversarial Networks by Solving Ordinary Differential Equations", In 34th Conference on Neural Information Processing Systems (NeurIPS 2020), Vancouver, Canada, 19 pages.

Simonyan, K., Vedaldi, A. and Zisserman, A., 2013, "Deep inside convolutional networks: Visualising image classification models and saliency maps", arXiv preprint arXiv:1312.6034., 8 pages.

Vincent, P., Larochelle, H., Lajoie, I., Bengio, Y., Manzagol, P.A. and Bottou, L., 2010, "Stacked denoising autoencoders: Learning useful representations in a deep network with a local denoising criterion" Journal of machine learning research, 11(12), 38 pages.

Zhao, J., Kim, Y., Zhang, K., Rush, A.M. and LeCun, Y., 2017, "Adversarially Regularized Autoencoders" arXiv e-prints, pp. arXiv-1706, 18 pages.

Al-Muhaini et al. ("Minimal Cut Sets, Petri Nets, and Prime Number Encoding in Distribution System Reliability Evaluation", © 2012 IEEE) (Year: 2012).

Rocchetto et al. ("Learning hard quantum distributions with variational autoencoders", npj Quantum Information (Jun. 28, 2018) (Year: 2018).

Chae et al. ("Collaborative Adversarial Autoencoders: An Effective Collaborative Filtering Model Under the GAN Framework", IEEE, Mar. 1, 2019) (Year: 2019).

Tantipongpipat et al. ("Differentially Private Mixed-Type Data Generation for Unsupervised Learning", ResearchGate, Dec. 6, 2019).

Zhao et al. ("Learning Hierarchical Features from Deep Generative Models" Machine Learning, PMLR 70:4091-4099, (Year: 2017).

* cited by examiner

METHOD FOR AN EXPLAINABLE AUTOENCODER AND AN EXPLAINABLE GENERATIVE ADVERSARIAL NETWORK

CLAIM OF PRIORITY

This application claims priority from U.S. patent application Ser. No. 17/527,726, filed on Nov. 16, 2021, entitled "METHOD FOR AN EXPLAINABLE AUTOENCODER AND AN EXPLAINABLE GENERATIVE ADVERSARIAL NETWORK," the entire contents of which are hereby incorporated by reference.

FIELD

An exemplary embodiment relates to the field of autoencoders and artificial intelligence.

BACKGROUND

Typical autoencoder architectures (Goodfellow et al., 2016; Hinton and Salakhutdinov, 2006) make use of an unsupervised machine learning approach. An autoencoder architecture does not utilize a single dependent variable to train the underlying neural network architecture. Instead, an autoencoder architecture is trained by measuring the loss between the reconstructed input and the original input data. A standard reference baseline autoencoder (Hinton and Salakhutdinov, 2006), as shown in FIG. 1, is a simple autoencoder architecture that includes an input layer 100, a hidden layer 110 and an output layer 120. The objective of a standard baseline autoencoder is to reconstruct the input 100 in the output layer 120 and to minimize the reconstruction loss to optimize the parameters of the neural network architecture.

The input 100 of an autoencoder architecture may be mapped to a latent representation by utilizing a neural network architecture 150 for the encoder architecture 130. The latent representation 110 of an autoencoder architecture may then be used as input to another neural network architecture 160 for the decoder architecture 140 to reconstruct the input 120. The neural network architectures of the encoder architecture and the decoder architecture may have multiple hidden layers to introduce nonlinearity to such architectures, resulting in deep neural network architectures. The parameters of an autoencoder architecture may be optimized using a cost function to minimize the error and applying the backpropagation algorithm.

Denoising autoencoders (DAE) (Gondara et al., 2016; Vincent et al., 2010) are an extension of the standard baseline autoencoder. The difference between a DAE and a standard baseline AE is that in a DAE the input to the DAE encoder component is a corrupted input unlike a standard baseline autoencoder, where the input to the encoder component of the autoencoder is the input dataset. A DAE may be used in scenarios where an autoencoder is required to reconstruct the clean "repaired" input data point from a corrupted version of the clean input, allowing the encoding function to be applied to the noisy input. The reconstruction loss of a DAE may be measured using the clean input data point, and the reconstructed data point from the corrupted version of the clean input.

The DAE architecture may be stacked to generate robust features or achieve optimal performance. The latent space of the initial DAE in a stacked denoising autoencoder (Vincent et al., 2010) may be used to train an additional DAE. The learnt latent space of each DAE, in a stacked denoising architecture, may be used as the clean input to the next denoising autoencoder.

A variational autoencoder (VAE) (Kingma and Welling, 2013) is a generative model that combines deep learning with variational inference. A VAE learns a distribution over the latent space by adding a regularization term, such as KL divergence (Erven and Harremoës, 2014), to the loss function of the VAE architecture. KL divergence measures the dissimilarity between two probability distributions. The encoder component of a VAE may learn the mean $\mu$ and the variance $\Sigma$ for the conditional distribution of the latent representation. The VAE architecture may sample from the mean $\mu$ and the variance $\Sigma$ to create a sample latent vector, and the sampled latent vector is used as input to the decoder component.

SemAuto (Bellini et al., 2017) is an algorithm that incorporates knowledge graphs within an autoencoder architecture for use in recommendation systems. A knowledge graph represents a collection of linked entities in a certain structure. The latent space of SemAuto includes the knowledge graph classes and categories associated with the subject item. The SemAuto architecture might not be a fully connected network and may provide connections between the subject item and the latent space that are identical, as they are constructed in the knowledge graph. SemAuto may be able to capture categorical information of the items rated by the user and capture the shared side information of all the items rated by the user. The weights in the encoder part of SemAuto are interpreted as the importance of the corresponding knowledge graph trait in the rating process of the users. Highly rated items in the latent space are potential features that match the taste of the user.

GEE (Nguyen et al., 2019) is a gradient-based explainable architecture that uses a variational autoencoder to provide explainability for anomaly detection tasks. GEE includes two main components: a VAE and a gradient-based fingerprint module. Data points that result in a large variational autoencoder reconstruction error, based on a threshold value, are labelled as anomalies. GEE attempts to achieve explainability for anomalies, by computing fingerprints from the derivative of the variational lower bound for each feature. These fingerprints are then clustered, and any large clustering variations are reported as anomalies.

Antwarg et al. (2019) generated explanations, for anomaly detection using an autoencoder architecture, using SHapley Additive explanations (SHAP). The features with the highest reconstruction loss of the autoencoder architecture are used to calculate the SHAP values. The SHAP values represent the feature importance of the input features. Antwarg et al. (2019) relates the SHAP values to the values in the input data point, to explain the contributing and offsetting features for the data points with the highest reconstruction loss. Other variations of implementations for an autoencoder architecture, such as the work in Zhao et al. (2017), may include combining an autoencoder architecture with a GAN architecture.

A Generative Adversarial Network (GAN) (Goodfellow et al., 2014) is a generative model trained via an adversarial process to create realistic data points. The GAN architecture includes two main components: the generator G and the discriminator D. G may sample from an input noise in order to construct a sample data point. The generated sample may resemble samples from the training dataset. The generator may attempt to generate samples which deceive D into assessing that the sample was retrieved from the training dataset. The inputs of D may include the samples from the training dataset and the samples generated from G. The objective of D may include the identification of the samples that were retrieved from the training dataset.

The GAN framework is based on a minimax two-player game, where G seeks to maximize the probability of D making a mistake, and D seeks to estimate the probability that the sample came from the training dataset rather than G. D may output a low probability if the sample was likely generated from G, or a high probability if the sample was likely retrieved from the training dataset. A hyperparameter k may be utilized to have k training iterations of D for k steps before the next training iteration of G. A GAN framework may force G to create realistic samples by training the architecture using backpropagation to train the gradients of the GAN model. The cost function of the discriminator may be defined as the cross-entropy between the predictions of the discriminator and the correct labels, where each label identifies whether the sample is from the training dataset or generated from G, while the cost function of the generator may be defined as the negative cost of D.

Conditional Generative Adversarial Nets (CGAN) (Mirza et al., 2014) extend the GAN architecture to be conditioned on additional information, in order to control the output generated from the generator G on the defined conditions. A CGAN architecture may include a discriminator component and a generator component. The inputs to the generator may include the class label and the input noise. The inputs to the discriminator may include the generated samples, the class labels, and the training dataset. The conditions of CGAN may be one-hot encoded vectors of the class label of the input for the network, or any type of data that may represent a conditional constraint on the input observation. The conditional constraint in CGAN may be inserted as an additional input to G and as an additional input to D. Other variations of GANs, such as the work in Denton et al. (2015), may include the integration of a conditional GAN within a Laplacian pyramid, known as LAPGAN, or the reparameterization of the latent generative space as a mixture model as shown in Gurumurthy et al. (2017), known as DeliGAN.

Kocaoglu et al. (2017) describes a method to train a causal implicit generative model (CiGM), using adversarial training, for a given causal graph. The method includes two architectures: Causal Controller and CausalGAN. The Causal Controller architecture is a variation of the Wasserstein GAN, and it is used to control the distribution of the images to be sampled from when intervened or conditioned on a set of image labels. The Causal Controller architecture is set to sequentially produce the image labels according to the causal graph. Kocaoglu et al. (2017) demonstrate the possibility of using a feed forward network to calculate the function maps $f$ between causal variables in a structural causal model (SCM). CausalGAN captures the dependencies between class labels and the distribution of the generated images by learning the function maps and the distributions of a causal model. The CausalGAN architecture is an extension of the GAN architecture, and it allows images to be generated on a specific set of conditions or interventions, based on a causal graph, as defined in the Causal Controller. The CausalGAN includes two additional neural networks to calculate the loss of the labels of the real samples and the loss of the labels of the generated samples. CiGM assumes that the causal graph is pre-defined before training the Causal Controller and CausalGAN. The optimal generator architecture of the CausalGAN is able to sample with the characteristics as defined in the causal controller.

Pezeshkpour et al. (2020) describes a method that uses an autoencoder as an additional input to a GAN architecture. The latent space produced by the encoder is utilized as a conditional constraint on the generator to generate samples based on the encoded data. The input of the encoder may include sentences and descriptions that are gathered through the use of the system and relevant information such as credit score or income features. The objective of the generator for the described method (Pezeshkpour et al., 2020) is to generate explanatory statements based on the inputs received from the autoencoder. The objective of the discriminator is to produce a probability to indicate if the statements were retrieved from the training dataset.

LogicGAN (Graves et al., 2020) attempted to introduce an element of explainability to GANs by computing an explainable matrix M, that may utilize the Hadamard product (Horn, 1990), and using this matrix to update the gradient. The generated image, the discriminator, and the output of the discriminator are used as the input to a DeepSHAP algorithm to compute the absolute values of feature importance generated by DeepSHAP, which is then utilized to guide the training of the generator, by acting as a gradient mask on the most important features. The work in Graves et al. (2020) used DeepSHAP to compute Shapley values as a form of explanation for GAN output. In a similar architecture, the work in Nagisetty et al. (2020) implemented three post-hoc explanation algorithms: saliency map (Simonyan et al., 2013), SHAP (Lundberg & Lee, 2017), and LIME (Ribeiro et al., 2016).

The prior art does not provide explainability of the input feature space in relation to the output, where the explainability of the model may be losslessly traced back from the output to the global input space in a neural network architecture. The prior art also relies on post-hoc methods to provide some semblance of explanation. SemAuto (Bellini et al., 2017) relies on the assumption that the weights entering a particular node represent the worthiness of such node, in an autoencoder that is not a fully connected network. In GEE (Nguyen et al., 2019) explanation-like attempts are based on clustering extracted gradients that share similar characteristics. This limits the explanations to clustering-based approaches and may be defined as an external post-hoc method. The work in Antwarg et al. (2019) is an external post-hoc method and cannot be integrated in a real-time deep learning architecture. The work in Antwarg et al. (2019) is unable to analyze the importance of the features during the training phase of the model. Thus, there exists a need in the field of autoencoders to construct partitions, unlike previous mentioned methods, in order to generate better explainability.

The prior related work does not provide explainability of the input feature space in relation to the output of the discriminator, where the explainability of the model may be tracked back from the output to the global input space, and where the architecture of the generator and the architecture of the discriminator are a deep neural network architecture. The CGAN architecture (Mirza et al., 2014), the work in Pezeshkpour et al. (2020), and the causal implicit generative model (CiGM) (Kocaoglu et al., 2017) are able to control the generated samples based on a specified label, however, they do not generate an explanation to explain G or D. The xAI-GAN (Nagisetty et al., 2020) does not construct an explanation of the internal architecture of the generator or discriminator. There is a need in the field to be able to construct hierarchical partitions, unlike previous mentioned methods, in order to achieve multiple levels of explainability for a Generative Adversarial Network (GAN).

SUMMARY

Autoencoders are a type of artificial neural network architecture which may be used to encode input data in a latent space and to reconstruct the input data from the latent space. An exemplary architecture may be validated by measuring the difference between the reconstructed input and the original input. In an exemplary embodiment, the dimensionality of the latent space may be smaller than the input space in order to force the neural network architecture to compress the input space and hence reduce the dimensionality of the feature space in an unsupervised machine learning approach.

In an exemplary embodiment, an explainable autoencoder may convert a black-box autoencoder model into a white-box autoencoder model. An embodiment may also explain the contribution of the input features to the latent space by partitioning the model and constructing feature attributions. In an exemplary embodiment, an explanation may be beneficial for understanding the input features that are affecting an anomaly in an anomaly detection task or for understanding the effect of noise on the latent space in a denoising autoencoder architecture. Additionally, an embodiment may provide an explanation from the latent space to the reconstructed input space in order to understand which latent space features are contributing the most to the reconstructed error by constructing feature attributions. An embodiment may implement an encoding backmap. The backmap may be used to construct explanations in autoencoder systems which are connected with larger deep learning systems.

Generative Adversarial Networks (GANs) may be implicit generative models and may be used to create realistic samples from a given training dataset and a prior distribution. The GAN architecture may include a generator and discriminator, which are designed to compete against each other. The generator may generate samples that are then evaluated by the discriminator to determine whether the generated samples are from the training dataset or from the generator, thus in general, whether the generated samples derive from a similar input space distribution as a generalized training dataset.

An exemplary embodiment may implement an Explainable Generative Adversarial Network (XGAN), which may extend a GAN architecture to an explainable architecture by incorporating multiple variants of explainable architectures in the generator and the discriminator.

An exemplary embodiment may provide an explainable autoencoder (XAED) which may explain the feature attribution of the input variables towards the compressed data representation. This may be useful in cases where an autoencoder is used for a classification task, such as anomaly detection task, as well as other exemplary embodiments, such as where an autoencoder is the input to other machine learning systems, or where an autoencoder is a component in an end-to-end deep learning architecture. XNNs or Interpretable Neural Networks (INNs) may be used form the underlying architecture to an autoencoder in order to create an end-to-end white-box machine learning system. The created explainable autoencoder may be as powerful as a standard black-box model. XAEDs may utilize and are fully compatible with all current deep learning libraries and architectures, allowing them to take advantage of all performance advancements available for existing deep learning systems.

An explainable autoencoder allows an explainable and/or interpretable model to be created in a flexible manner. An embodiment may be trained without the need for an external induction step or may be trained in one or more phases. Further, induction may still be incorporated into parts of an exemplary model.

An exemplary embodiment may allow fusion of models through partitioning. Encoding and explanation may be computed in a single feed-forward pass, without the need for further processing or perturbation.

An embodiment may be initialized either by transferring knowledge from a black-box model, or by transferring knowledge from an existing ruleset, which has been trained externally. Transfer learning may improve the speed and quality of the resulting interpretable model.

An exemplary embodiment may be combined it into larger deep learning systems, such as those found in reinforcement learning (RL).

Another embodiment may incorporate other machine learning systems to incorporate an end-to-end explainable deep learning system which incorporates an XAE as part of the pipeline. An exemplary embodiment may integrate a backmap. Another embodiment may be used to create interpretable AutoML models.

The explainable architecture modules in an exemplary XGAN may allow for explanations to be generated for the given input parameters. An embodiment may implement an explainable discriminator which may provide an explanation describing the reasons a particular sample is identified as fake.

The explainable architecture modules in an exemplary XGAN may also allow the generated explanations to be utilized in the generator XG(z, e) and in the discriminator XD (z, e) as additional parameters e.

An exemplary embodiment may further implement extensions supported by explainable architectures such as Backmap and bias detection to be used within the architecture of the explainable generator XG and the architecture of the explainable discriminator XD.

The explainable architecture in an exemplary explainable generator or explainable discriminator may be initialized, for example, by transferring knowledge from a black-box model, or by transferring knowledge from an externally trained existing ruleset. Transfer learning may improve the speed and quality of the resulting interpretable model.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Figure 3:
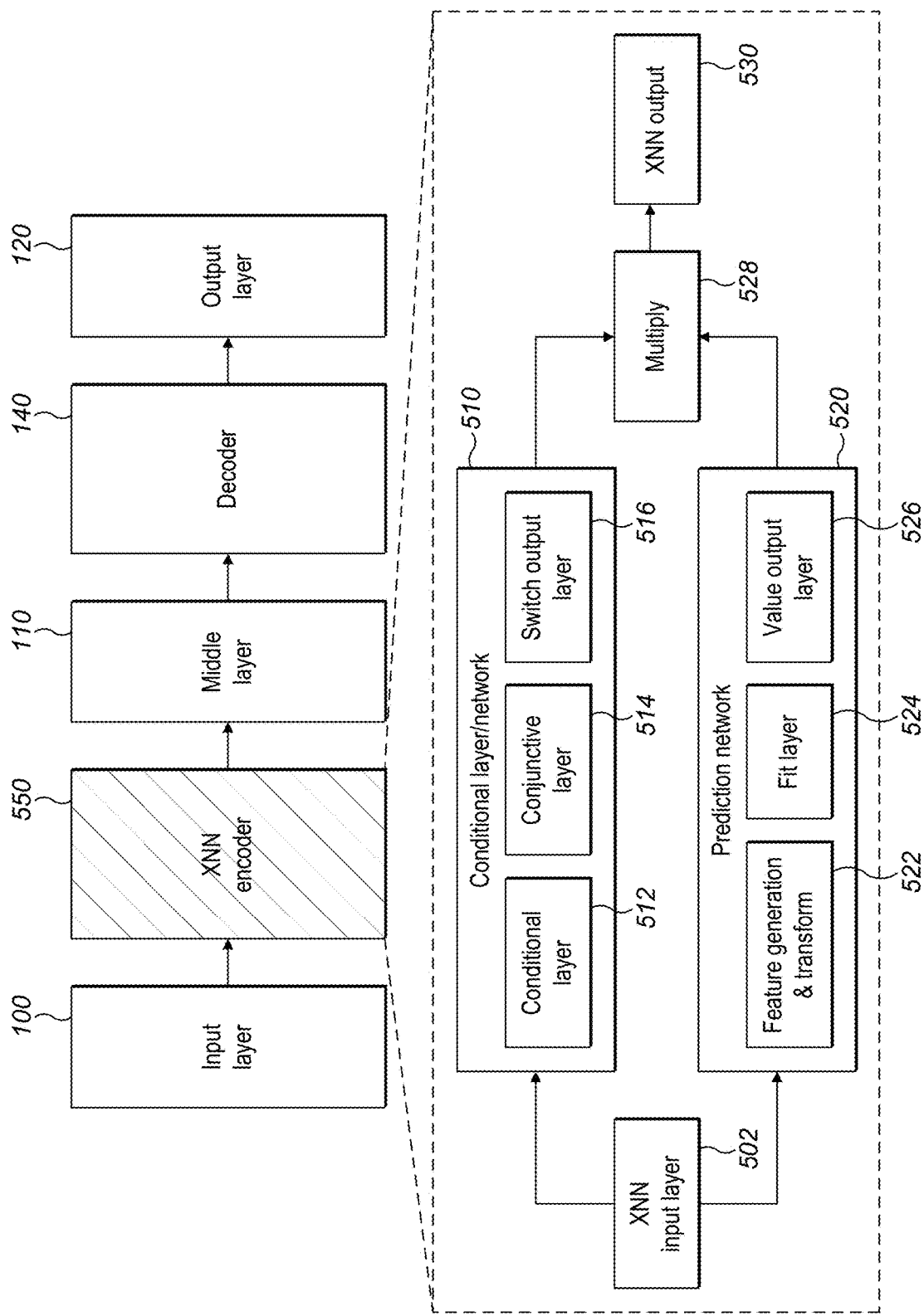
FIG. 3 is an exemplary embodiment of an explainable encoder with an XNN architecture.
Figure 4:
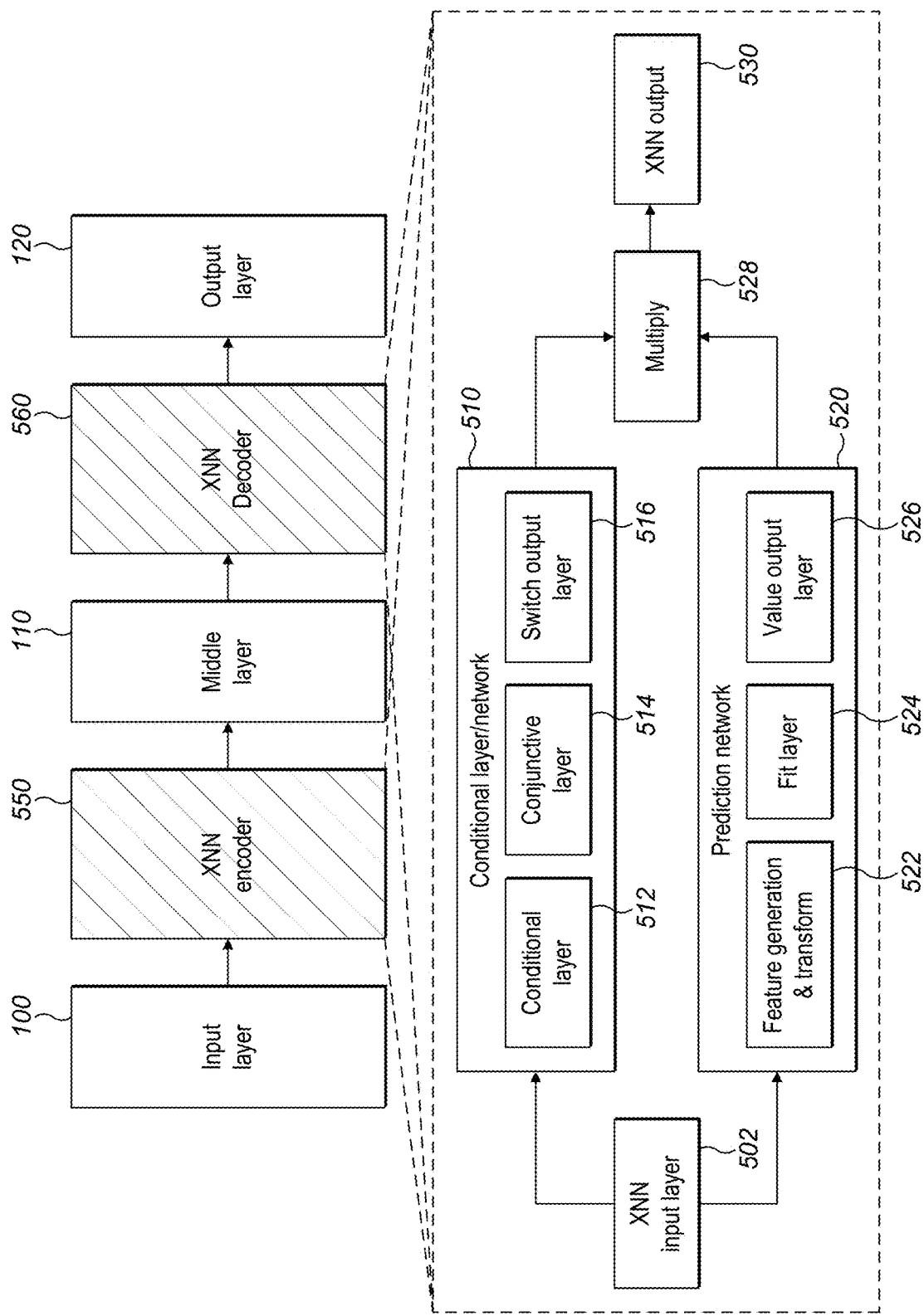
FIG. 4 is an exemplary embodiment of an explainable encoder and an explainable decoder with XNN architecture.

An exemplary embodiment may implement an explainable architecture in an autoencoder to create an explainable autoencoder (XAED). The explainable architecture may be an explainable neural network (XNN). XNNs are a new type of Artificial Neural Networks (ANNs) that are inherently interpretable and explainable. Interpretability is built within the XNN architecture itself, yet it functions like a standard neural network, eliminating the need to apply additional techniques or processing for interpreting the result of a neural network. XNNs may compute both the answer and its explanation in a single feed-forward step without any need for simulations, iterations, perturbation, and so on. XNNs are also designed to be easily implementable both in software but also in hardware efficiently, leading to substantial speed and space improvements. With reference to FIG. 3 and FIG. 4, an input layer 502 may provide input, possibly simultaneously, into both a conditional network 510 and a prediction network 520. The conditional network 510 may include a conditional layer 512, an aggregation layer 514, and a switch output layer 516 (which outputs the conditional values). The prediction network 520 may include a feature generation and transformation 522, a fit layer 524, and a prediction output layer (value output) 526. The layers may be analyzed by the selection and ranking layer 528 that may multiply the switch output by the value output, producing a ranked or scored output 530. The explanations and answers may be concurrently calculated by the XNN by the conditional network and the prediction network. The selection and ranking layer 528 may ensure that the answers and explanations are correctly matched, ranked and scored appropriately before being sent to the output 530.

The processing of the conditional network 510 and the prediction network 520 may be in any order. Depending on the specific application of the XNN, it may be contemplated that some of the components of the conditional network 510, such as components 512, 514, and 516, may be optional or replaced with a trivial implementation. Depending on the specific application of the XNN, some of the components of the prediction network 520, such as components 522, 524, and 526, may be optional or replaced with a trivial implementation.

It may further be contemplated that in some circumstances, the selection and ranking layer 528 and the output 530 may be combined together into one integrated component. For optimization purposes, the XNN may also be implemented with both the conditional network 510 and the prediction network 520 together with all their components merged together into one network. This merged conditional and prediction network may also be merged together with a combined selection and ranking layer 528 and the output 530. This optimization will still result in a logically equivalent XNN, which may be faster for feed forward processing but may suffer when it comes to training via backward propagation and gradient descent techniques.

The XNN can thus be implemented in a way that there is the input layer 502, and a combination of the conditional network 510 and the prediction network 520, including the conditional layer 512, aggregation layer 514, switch output layer 516, feature generation and transformation layer 522, fit layer 524, prediction layer 526, and ranking layer 528 leading to the output 530. This combination may apply to all embodiments and implementations of the XNN, including both software and hardware implementations. The transformative capabilities of XNNs in this regard are unique and unparalleled in other neural network implementations since the white-box nature of XNNs allows flexibility and extreme merging to be performed without affecting the logical behavior of the XNN, although this affects various attributes of a practical implementation, such as size/space usage, performance, resource usage, trainability, and overall throughput.

In an exemplary embodiment, an XNN architecture combines the results from the switch output and may include the following exemplary ruleset:

$$f(x, y) = \begin{cases} \text{Sigmoid}(\beta_{0,0} + \beta_{1,0}x + \beta_{2,0}y + \beta_{3,0}x^2 + \beta_{4,0}y^2 + \beta_{5,0}xy), & x \leq 10 \\ \text{Sigmoid}(\beta_{0,1} + \beta_{1,1}x + \beta_{2,1}y + \beta_{3,1}x^2 + \beta_{4,1}y^2 + \beta_{5,1}xy), & x > 10 \land x \leq 20 \\ \text{Sigmoid}(\beta_{0,2} + \beta_{1,2}x + \beta_{2,2}y + \beta_{3,2}x^2 + \beta_{4,2}y^2 + \beta_{5,2}xy), & x > 20 \land y \leq 15 \\ \text{Sigmoid}(\beta_{0,3} + \beta_{1,3}x + \beta_{2,3}y + \beta_{3,3}x^2 + \beta_{4,3}y^2 + \beta_{5,3}xy), & x > 20 \land y > 15 \end{cases}$$

The ruleset may be found following the activation function. The exemplary architecture may begin with an input 502. The input may then be used as inputs to the conditional network 510 and the prediction network 520. As illustrated in FIG. 3 and FIG. 4, the prediction network may contain a feature generation and transformation layer 522, a fit layer 524, and a value output layer 526. The value output layer 526 may provide equations which correspond to rules which weigh different features of the inputs. Further, the input 502 may be used as input to the conditional network 510, as illustrated in FIG. 3 and FIG. 4. The conditional layer 512 and aggregation layer 514 may produce conjunctive rules or other logical equivalents or partitions which are represented in the switch output layer 516.

The outputs of the value output layer 526 and the switch output layer 516 may be combined in the output layer 530. Once the output layer 530 has been formed, a sigmoid or other activation function may be applied to the result, depending on the application.

XNNs may present an intuitive way to construct interpretable models, while still utilizing the power of ANNs and related methods such as deep learning. Once the model is trained through back-propagation or a similar method, the resulting neural network can be used to serve predictions and the inner structure of the XNN can be used to construct the rules.

INNs may provide an architecture which can automatically generate an explanation using existing deep learning techniques. INNs may utilize existing software infrastructures and hardware used for neural networks while remaining fully compatible with backpropagation training techniques.

The architecture may include a feature transformer which converts the input to some hidden features, and a number of relevance estimators which transform the hidden features to feature weights. The feature weights are then combined with the transformed input in order to extract the attribution of each input transformed feature. The resulting feature attributions are then aggregated for the result. Feature attribution may be extracted at different levels. In the simplest form, attribution may be linked directly with the original inputs. In other cases, such as CNNs, feature attribution may also be computed for higher-level features which are typically found in kernels and filters. Additionally, INNs may split the model in various partitions, thus enabling a higher-level of flexibility and interpretability, by enabling a mixture of local or segmented explainability. In some cases, INNs are also capable of providing global explainability.

Figure 5:
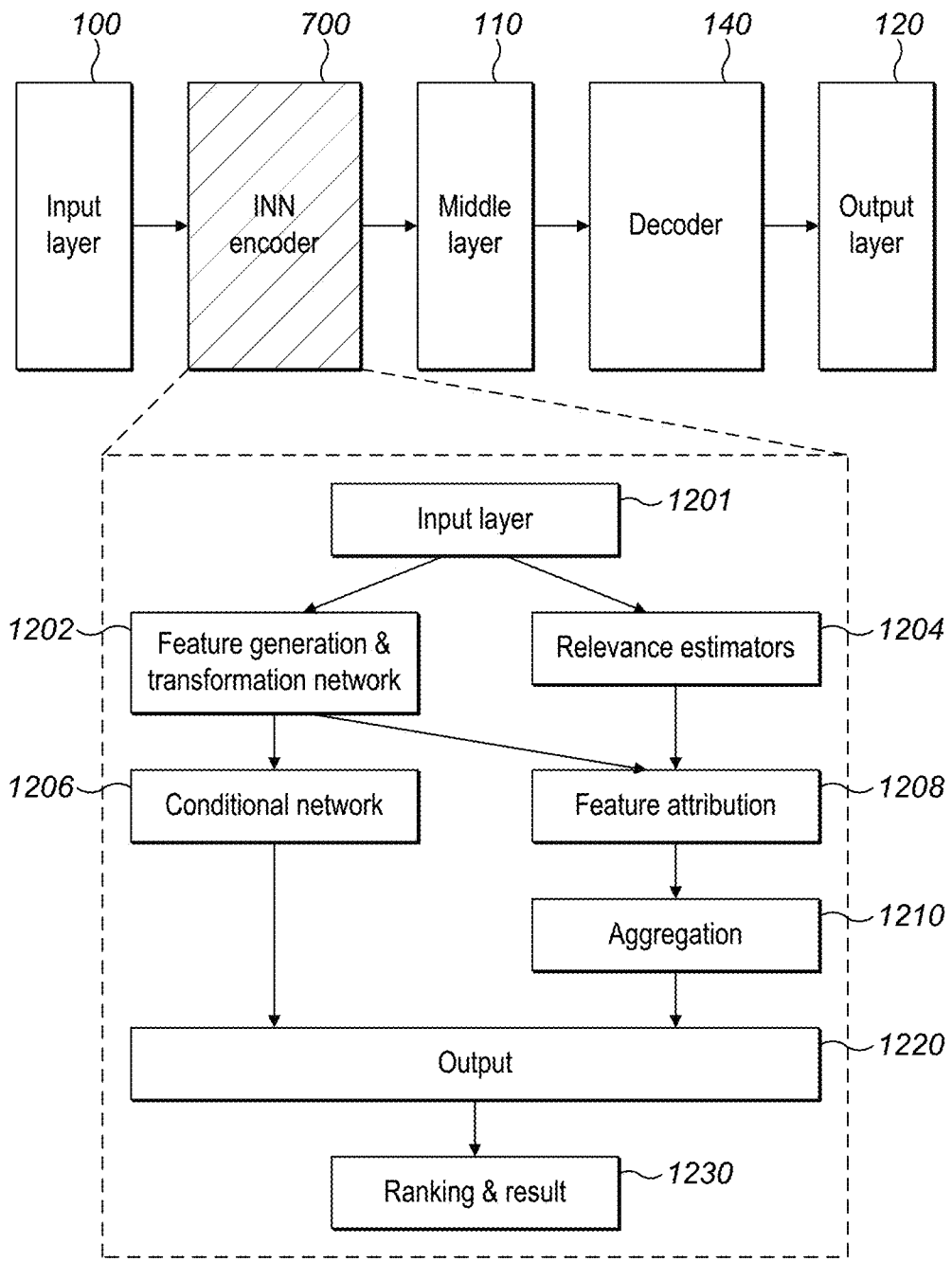
FIG. 5 is an exemplary embodiment of an explainable encoder with an INN architecture.
Figure 6:
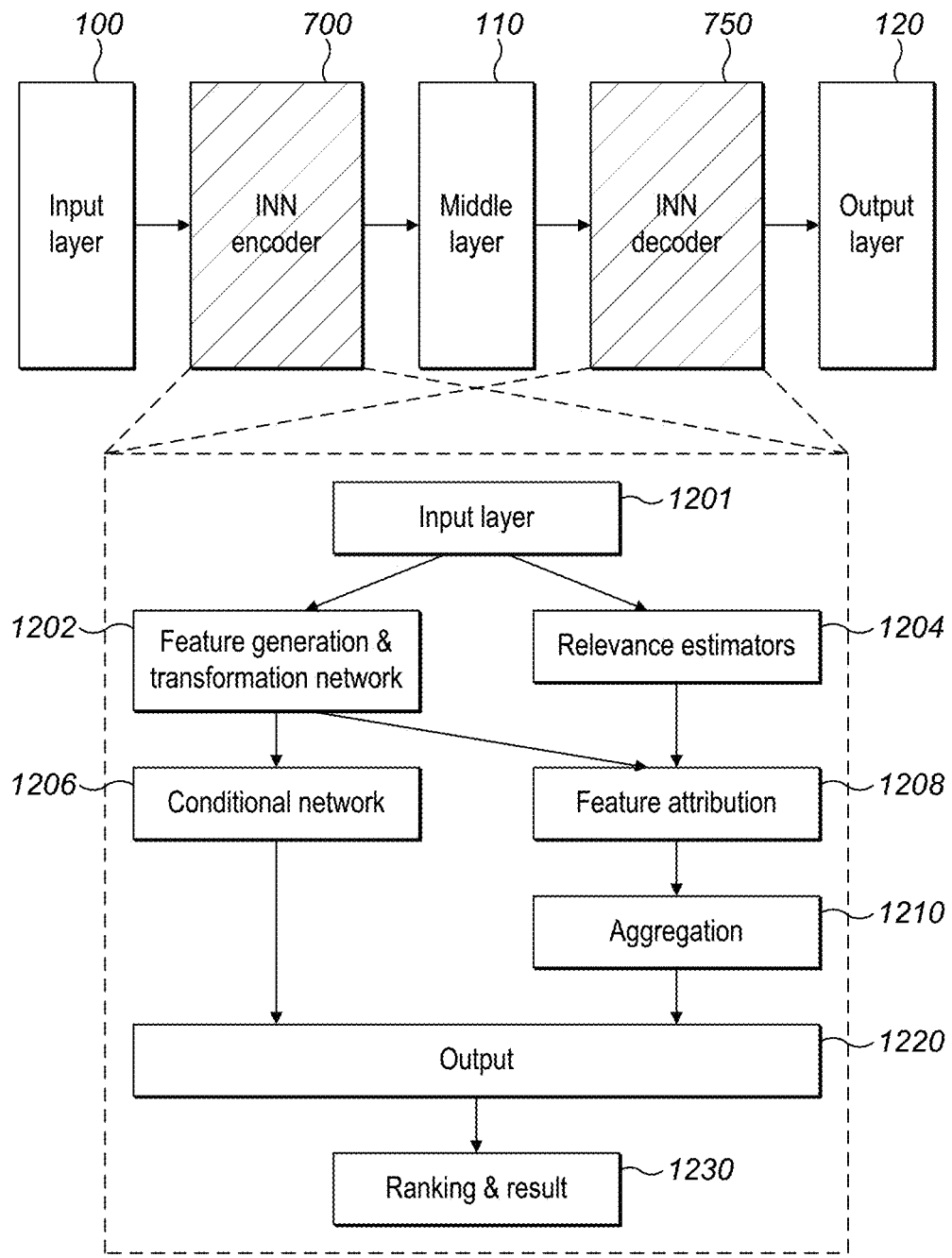
FIG. 6 is an exemplary embodiment of an explainable encoder and an explainable decoder with an INN architecture.

An exemplary INN architecture may start with some input vector X 1201, as shown in FIG. 5 and FIG. 6. The input may then connect to a feature generation and transformation network 1202 and to k relevance estimators 1204. The transformed features may be abstract or high-level features such as those computable using a deep neural network such as CNN, a non-linear mathematical function such as polynomial expansion or some other form of generated features, which may be discrete or continuous. The relevance estimator may calculate the coefficient, at least in a local manner, of each transformed feature.

In mathematical terms, the transformation network may be denoted as a function $T(X)$. Similarly, $\theta_j(X)$ represents the relevance function of the jth partiton. If $X \to T(X)$ returns a vector with z transformed dimensions, then $X \to \theta_j(X)$ also returns a vector with z coefficients, or relevance weights. It may be assumed that $|T(X)| = |\theta_j(X)| = z$.

INNs are flexible enough such that they may model complexity through various options and configurations. The functions $X \to T(X)$ and $X \to \theta_j(X)$ may be a deep neural network which makes it possible to model complex abstract features. It may be noted that the combination of $T(X)$ and $\theta_j(X)$ may represent various embodiments of explainable models which are possible to implement with an INN architecture.

In the conditional network 1206, the neural network may handle the conditional aspect of the model. That is, the conditional network 1206 may evaluate rules in the form of IF-conditions in order to activate one or more partitions. The output of $C_i(X)$ is binary, i.e., 1 or 0. It may be noted that the partitions may be static or dynamic and may be discovered either through an external partitioning process or through a connected neural network. It may also be noted that INNs may function with only one partition. For example, an exemplary INN may be configured such that for all values of X, $C_i(X)$ is always one (1). This is equivalent to having zero partitions. In this exemplary case, there is no need to apply a partitioning method to find suitable partitions.

In the feature attribution layer 1208, the neural network computes the feature attribution of each transformed feature, which is activated by the associated partition. The relevance attribution may multiply the result of the computed coefficient with the transformed feature. In mathematical terms, the feature attribution layer 1208 may compute $\theta_j(X)T(X)$ for the jth partition. The output of feature attribution layer 1208 may serve as the basis of the explanation generation. The values from this layer may be used to generate feature attribution graphs, heatmaps, textual explanations or any other contemplated form of explanation.

In the aggregation layer 1210, the neural network may aggregate the results for each partition. This may provide the predictive result for the activated partition. In mathematical terms, the aggregation function may be defined by $A_j(\theta_j(X) T(X))$. In an exemplary setting, the aggregation function may be a simple summation of the feature attributions. This becomes equivalent to a linear function, at least functioning in a local manner, providing a result $R_j = \theta_j(X)_1 T(X)_1 + \ldots + \theta_j(X)_z T(X)_z$.

Finally, the switch output layer 1220 may select the activated partition. If more than one partition is activated, a ranking function 1230 may need to be applied. The result is generated using the switch output 1220 or the output of the ranking function 1230.

An exemplary embodiment may provide an XAED with an XNN. FIG. 3 may illustrate an exemplary autoencoder with an explainable architecture. The example in FIG. 3 includes an XNN encoder 550 and a black-box decoder 140. In an alternative exemplary embodiment, FIG. 4 illustrates an autoencoder architecture that uses both an XNN encoder 550 and an XNN decoder 560.

In an alternative exemplary embodiment, an XAED may be based on an interpretable neural network (INN) architecture to provide explainability to the encoder architecture 700 and/or to the decoder architecture 750, as shown in FIG. 5 and FIG. 6. FIG. 5 may illustrate an exemplary explainable autoencoder which uses an INN encoder 700 and a black-box decoder 140. Alternatively, FIG. 6 illustrates an exemplary explainable autoencoder which uses both an INN encoder 700 and an INN decoder 750.

The input 100 of an autoencoder may be defined as $x \in R^d$. The input 100 of an autoencoder may be mapped to a latent representation z, using an explainable encoder architecture v, where $v \in \{XAI, XNN, XTT, XRL, XSN, XMN, INN\}$ or logically equivalent or similar architectures.

The latent space may then be used to reconstruct the input space x'. This can be computed using a black-box decoder or using by using an explainable architecture v' 1450, where $v' \in \{XAI, XNN, XTT, XRL, XSN, XMN, INN\}$ or logically equivalent or similar architectures. The parameters of an exemplary embodiment may be optimized using a cost function to minimize the error by applying the backpropagation algorithm.

Explainable architectures utilized in an exemplary explainable generative adversarial network (XGAN) or in an exemplary explainable autoencoder (XAE) models include, but are not limited to, explainable artificial intelligence (XAI) models, Interpretable Neural Nets (INNs), explainable Neural Nets (XNN), explainable Transducer Transformers (XTT), explainable Spiking Nets (XSN) and explainable Memory Net (XMN) models. A further exemplary embodiment may present methods for detecting bias both globally and locally by harnessing the white-box nature of explainable Reinforcement Learning (XRL).

Although some examples may reference one or more of these specifically (for example, only XAI or XNN), it may be contemplated that any of the embodiments described herein may be applied to XAIs, XNNs, XTTs, XSNs, or XMNs interchangeably. Another exemplary embodiment may relate to bias detection in Interpretable Neural Networks (INNs) and related grey-box models, which may be a hybrid mix between a black-box and white-box model. An exemplary embodiment may apply fully to the white-box part of the grey-box model and may apply to at least some portion of the black-box part of the grey-box model. It may be contemplated that any of the embodiments described herein may also be applied to INNs interchangeably.

An exemplary XNN may combine multiple local models into one global model. Local models may analyze a small area within the entire search space. In an exemplary embodiment, when a transaction is analyzed in a local manner, a linear model may sufficiently explain the model. On the other hand, global models may present the model in a holistic view. XNNs may merge the two—multiple partitions may represent the local zones while multiple linear models explain each partition. The combined partitions may present a global model. Exemplary XNNs may go beyond linear data; they may model non-linear data by embedding transformations within the neural network itself while still retaining explainability. Each layer, neuron, and connection within an XNN may have a precise, well known, and understandable function, unlike standard ANNs that are a black box Explainable Transducer Transformers (XTTs), may provide an alternative embodiment which may use a combination of: (i.) one or more transducers in a pipeline that outputs an answer together with its explanation as part of the transduction process; and (ii.) a suitable transformer architecture, that may optionally be a replacement for gated recurrent neural networks or similar types of machine learning models, where the attention mechanism may be extended to cater to the creation of the explanation alongside the answer.

The encoder part of the transformer may encode information about which parts of the input data are relevant to each other, together with information about which parts of the explanation data are relevant to each other. The encoded answer and explanation information may be held in a latent space. The decoder part of the transformer may decode the encoded information while using the attention mechanism to construct and eventually output both the answer and its associated explanation. It may be contemplated that alternative embodiments, such as using separate latent spaces for the answer and the explanation, and other logical modifications that may be amenable for practical and efficient implementations, especially for large scale parallel processing and also for hardware deployments may be used.

Explainable reinforcement learning (XRL) may provide an explainable reinforcement learning system based on the well-known Bellman equation for breaking down dynamic optimization problems into simpler subproblems. XRL may provide explanations to the actions and the environment where the XRL system is deployed. An action may refer to the input we provide to the environment, calculated by applying a policy to the current state. This may be discrete or continuous. The set of all possible actions is called the action space.

Figure 17:
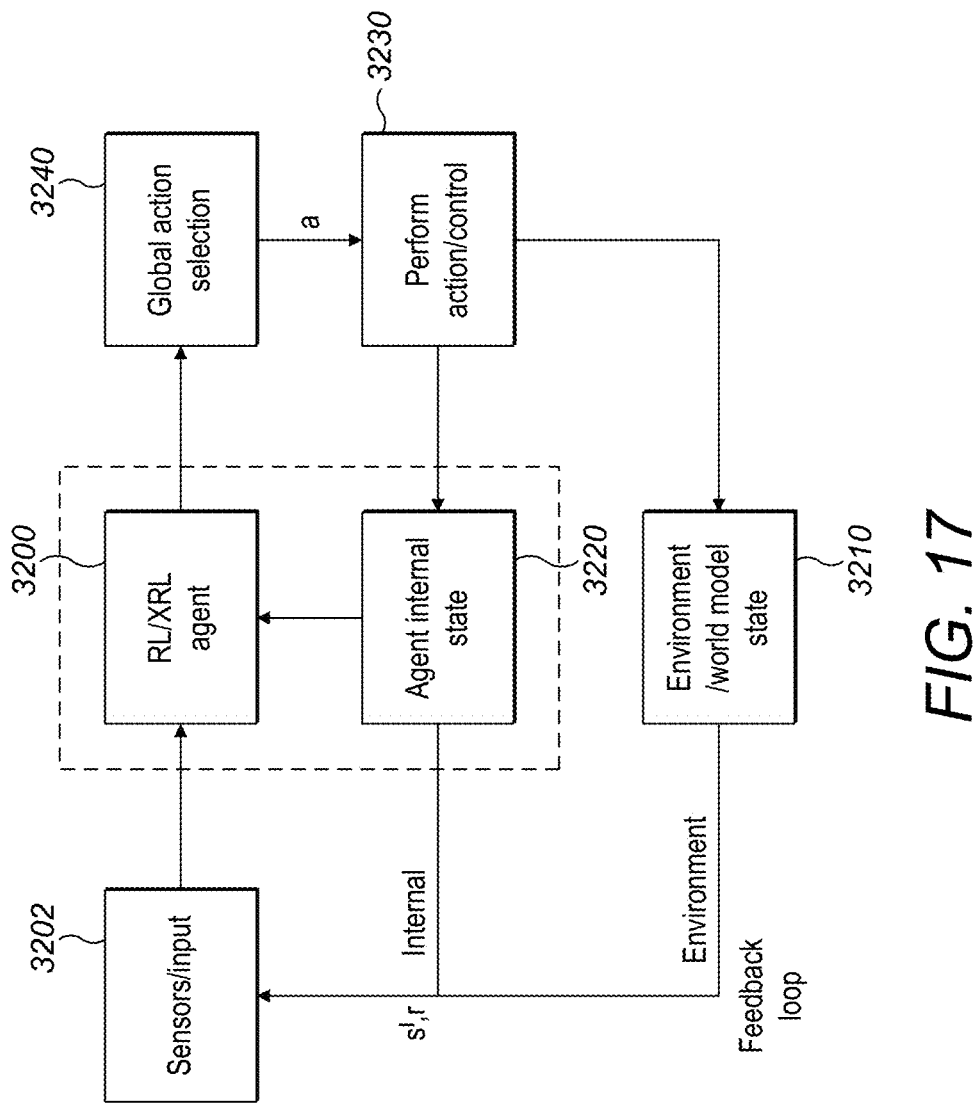
FIG. 17 is an exemplary illustration of an XRL/RL Agent FSM/Markov Process.

FIG. 17 illustrates a Finite State Machine (FSM)/Markov Process for an RL/XRL agent. The reinforcement learning or explainable reinforcement learning agent 3200 may note the action selection and ranking, that is, some action a for the current state s, which leads to state s'. The reward is denoted by r. The RL/XRL agent 3200 may have a simulation of the environment used in the action selection process 3240. The model may have additional connection points, depending on the structure of the model itself. An input 3202, such as one or more sensors, may provide information to the RL/XRL agent 3200. In a control engineering application, a typical XRL agent such as the one illustrated in FIG. 17 may utilize control engineering models, such as Nyquist analysis, Bode plots, and other forms of analyses to process a wide variety of processing signals. For example, the feedback loop between the environment state 3210 and the input sensors 3202 may be analyzed for stability, and the appropriate error and correction factors form part of the eventual action selection by the agent 3200. Some control engineering models are inherently white-box and thus allow for the generation of an explanation that is compatible with the XRL model described in this invention, allowing for a seamless incorporation of such models within a large superset of explanation capable systems. In a typical embodiment of an XRL agent utilizing a control engineering model, such as most applications involving real-time motor control (like in moving vehicles, aviation, energy applications, etc.) or some similar form of process control (like in manufacturing, chemical applications, etc.), the resulting explainable policy will include the control engineering model output directly, if the model is incorporated in the internal state of the agent 3220 or similar component, or indirectly, if the model is incorporated in the input sensors 3202 or in a combination of components 3230, 3210, 3202 and the possible transitions between them.

An exemplary XRL provides explanations XRL, as part of the model/environment model. The world model may return a partial or full explanation about the state s' and the reward r, which may be defined as $x_e$. The action space of an exemplary XNN may provide an associate explanation, such as a, $x_a$, which may denote an action and explanation of the action, respectively. A policy may refer to the mapping from the past experience to an action. The policy $\Pi$, in XRL may become $\Pi_x$, an explainable mapping, such that:

$$\Pi_x \approx s \rightarrow a, x_a$$
$$\Pi_x \approx s, x_s \rightarrow a, x_a$$

In terms of a behavioral finite state machine (FSM), each [state, action] pair can have a constant connection point prior to making the action after selecting the state, during the action, and after the action is made. For RL and XRL, another connection point is before, during and after the selection of the action under a policy $\pi$. This may be applicable when action space and/or the state space is either discrete or continuous. The explanation portion of an exemplary XRL learning process may lead to better safety and control mechanisms since it allows for a better understanding of the inner workings of the system which may require adjustments, monitoring and automatic or manual interventions.

An explainable autoencoder may have a black-box autoencoder 900 and the training dataset 910 as an input. A black box autoencoder 900 may be used as input in the explainable autoencoder to convert it into explainable model. The black-box encoder and optionally the black-box decoder may be required to measure the reconstruction loss |x−x'| to induce the black-box encoder component and optionally the black-box decoder component. The latent space z may be constructed by the explainable encoder v in an explainable autoencoder, where v∈{XAI, XNN, XTT, XRL, XSN, XMN, INN} or logically equivalent or similar architectures.

The explainable autoencoder may use a training dataset without having a black box autoencoder as the input. In this exemplary embodiment, a new explainable architecture x, where x∈{XAI, XNN, XTT, XRL, XSN, XMN, INN} or logically equivalent or similar architectures is trained directly from the training dataset. An explainable architecture x may transform the features using polynomial expansions, rotations, dimensional and dimensionless scaling, Fourier transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, topological transforms of Kolmogorov/Frechet/Hausdorff/Tychonoff spaces, difference analysis, normalization/standardization/binning/bucketization of data, and other suitable transformations. Features may also be processed to ensure rotational, translational and scale invariance and/or translational equivariance. In the case of INNs, other complex transformations may also be possible using multiple neural network layers.

The explainable autoencoder (XAED) may also implement graph-based methods such as: (i.) graph-regularized auto-encoder (GAE), (ii.) iterative generative graph modeling methods such as the Graphite method, (iii.) Deep Neural Networks for Graph Representations (DNGR), (iv.) Structural Deep Network Embedding (SDNE), and (v.) spectral autoencoder methods to integrate and interface XAEDs with Explainable Machine Learning systems that utilize graphs, hypergraphs or simplicial complexes.

It may be contemplated that the data synthesis capabilities of white-box models, such as XAI, XNNs, XTTs, XSNs and XMNs, can be used to generate training dataset samples that are presented as training to the XAED, using a variety of techniques such as: (i.) causal GAN based generation; (ii.) simulation using the white-box model itself and its hierarchical partition based model; (iii.) simulation using explainable generative adversarial imitation learning (XGAIL); and (iv.) any other suitable synthesis methods.

In an exemplary embodiment, human knowledge injection may be used to modify and extend the range of synthetic data available to the XAED. These synthesis methods may aid XAEDs in overcoming the data distribution shift problem that afflicts Deep Learning systems and may allow models to generalize better to a wider range of possible inputs in their input and training space. It is further contemplated that a combination of XAEDs and XGANs may be used to provide a practical solution for explainable data synthesis that may aid in solving the data distribution shift problem and may allow explainable Machine Learning systems utilizing such a combination of XAEDs and XGANs to generalize to a wider range of possible inputs in their input and training space.

An exemplary embodiment may utilize a combination of XGAN and/or an XAED system that take input from a combination of human knowledge injection (HKI) and system-knowledge injection to update the weights and coefficients of the underlying explainable architecture, to further increase the safety of the system.

It is further contemplated that XAEDs and XGANs may be utilized in the encoding, decoding, modelling, reproduction and generation of various different arbitrary numeric and non-numeric data distributions including but not limited to the Normal, Binomial, Bernoulli, Hypergeometric, Beta-Binomial, Discrete Uniform, Poisson, Negative Binomial, Geometric, Lognormal, Beta, Gamma, Uniform, Exponential, Weibull, Double Exponential, Chi-Squared, Cauchy, Fisher-Snedecor, and Student T distributions using the appropriate parameters applicable for the distribution or set of distributions chosen to be used in a specific implementation.

It may be further contemplated that an XAED and/or XGAN may be utilized in the recognition, classification, and generation of data distributions within an Explanation and Interpretation Generation System (EIGS). It is further contemplated that the XAED and/or XGAN system explanations may be tailored to a particular application via appropriate Explanation Output Templates (EOTs) and Explanation Structure Models (ESMs) or other suitable configuration mechanisms.

It is further contemplated that one or more XAEDs and/or XGANs architectures may be utilized to generate parameters of a data distribution, including but not limited to the Normal, Binomial, Bernoulli, Hypergeometric, Beta-Binomial, Discrete Uniform, Poisson, Negative Binomial, Geometric, Lognormal, Beta, Gamma, Uniform, Exponential, Weibull, Double Exponential, Chi-Squared, Cauchy, Fisher-Snedecor, and Student T distributions, to be utilized for generative models or similar architectures. In an exemplary embodiment, two XAEDs are used to induce the mean µ and standard deviation σ from a black-box variational autoencoder architecture, to induce a white box model for the respective parameters of the data distribution. It is further contemplated that for other types of distributions, the relevant distribution parameters, such as shape, location, scale and cumulative parameters are calculated via one or more XAEDs.

An explainable generative adversarial network (XGAN) may include an explainable generator architecture and a black-box discriminator, an explainable discriminator architecture and a black-box generator architecture, or an explainable generator architecture and an explainable discriminator architecture. The input requirements may vary according to the explainable architectures used in the generator and the discriminator of the explainable generative adversarial network.

An exemplary XGAN may include: (i.) an explainable generator architecture; (ii.) an explainable discriminator architecture; or (iii.) an explainable generator architecture and an explainable discriminator architecture. The input required may vary according to the explainable architectures included in the XGAN.

The inputs to an explainable architecture, which may be required when the XGAN includes an explainable generator architecture XG, and a black-box discriminator D, may be the black-box generator architecture G of the black-box GAN model and the training dataset that was used to train the black-box GAN model. The black-box generator architecture G may be used to induce the explainable white-box generator architecture XG and to measure the loss function. The training dataset may be sampled and combined with samples generated from the generator XG. The black-box discriminator D may generate a probability to the input samples, indicating if the samples were retrieved from the training dataset.

The inputs to an explainable architecture, which may be required when the XGAN includes an explainable discriminator architecture XD, and a black-box generator G, may be the black-box discriminator D of the GAN model and the training dataset. The black-box discriminator architecture D may be used to induce the explainable white-box discriminator XD, and to measure the loss function. The training dataset may be sampled and combined with samples generated from the black-box generator G. The white-box discriminator XD may generate a probability to the input samples, indicating if the samples were retrieved from the training dataset.

The inputs to an explainable architecture, which may be required when the XGAN includes an explainable generator architecture XG and an explainable discriminator architecture XD may be the black-box discriminator architecture D of the GAN model, the black-box generator architecture G of the GAN model and the training dataset. The black-box discriminator architecture D may be used to induce the explainable white-box discriminator architecture, such as to measure the loss function of the explainable discriminator architecture. The black-box generator architecture G may be used to induce the explainable white-box generator architecture XG, such as to measure the loss function of the explainable generator architecture. The training dataset may be sampled and combined with samples generated from the white-box generator XG. The white-box discriminator XD may generate a probability to the input samples, indicating if the samples were retrieved from the training dataset.

The explainable generative adversarial architectures may generate multiple types of explanations, which may include partitioning information, internal coefficients of the model, and feature attributions of the input dataset. In an exemplary embodiment, the XGAN may implement a hierarchical partition structure with dynamic splitting and merging providing a practical means of adaptation to novel and/or previously unforeseen data, and to representing information at multiple levels of detail and scale factors. It is contemplated that the partition hierarchy splitting and merging processes may be further enhanced with the use of the XGAN's generator and discriminator, to generate increasingly complex structures ranging from combinations of trees, graphs, hypergraphs, and simplicial complexes.

Explanations may be used as input to the components of the explainable architectures to provide feedback information. The XGAN system may construct explanation scaffolding from the output produced by the explainable architecture of the generator XG and/or discriminator XD and use it to illustrate such results to the interpreter to assist in understanding such how the model arrived at such prediction. An interpreter may be the end-user or a component within the XGAN system. The underlying components of an XGAN may require model interpretation in order to update their states or internal parts of the model. At least three types of model interpretation may be contemplated: basic interpretation, explanatory interpretation, and meta-explanatory interpretation. A basic interpretation may refer to a prediction output o that can be understood by the sub-component. An explanatory interpretation may be represented by a 2-tuple vector <o, w> which may refer to a prediction output o combined with a model explanation w for such predicted value, that can be understood by the sub-component. A model explanation may include coefficients θ of the where explainable architecture x, x∈{XAI, XNN, XTT, XRL, XSN, XMN, INN} or logically equivalent or similar architectures, that may be utilized to explain the feature importance of the input features for a given observation. A meta-explanatory interpretation may be represented by a 3-tuple vector <o, w, j> which may include the prediction output o, the model explanation w, and justification of the model explanation j. The model justification j provides additional information about the assumptions, processes and decisions taken by the explanation system that may be taken into consideration to produce the model explanation. The model explanation and meta-explanatory interpretation may be utilized by the interpreter to update components within the XGAN system.

It may be contemplated that the data synthesis capabilities of white-box models can be used to generate additional synthetic training dataset samples that augment the training dataset. It is further contemplated that an XGAN and/or an XAED may be used in an efficient practical implementation of a data synthesis generation solution.

The explainable generative adversarial architectures may include a noise variable z. The noise variable z may be used by the generator to sample from the desired distribution. The explainable generative adversarial architectures may include additional variables as input to the generator and optionally input to the discriminator that are used to condition the sample generated from the generator. An example of the additional variables may include a one-hot vector of the class labels, a causal controller vector, or the bottleneck layer of an autoencoder architecture.

The output may be an explainable autoencoder model constructed of an explainable encoder with an architecture v, where v∈{XAI, XNN, XTT, XRL, XSN, XMN, INN} or logically equivalent or similar architectures. FIG. 3 may illustrate an exemplary explainable autoencoder where the encoder is an XNN 550. FIG. 5 may illustrate an exemplary explainable autoencoder where the encoder is an INN 700. Optionally the architecture may include an explainable decoder with an architecture v', where v'∈{XAI, XNN, XTT, XRL, XSN, XMN, INN} or logically equivalent or similar architectures, as illustrated in exemplary FIG. 4 and FIG. 6.

The explainability may be provided via the extraction of the partition information of the XAED and the construction of the feature attributions for the features of the training dataset. A partition may be a small area of the model within the entire search space. A local model may represent the fit of the model within a specific partition. The extraction of partition information, such as the partition boundaries, may facilitate analysis by an external observer. The coefficients $c$ of a local model may be used as the feature attribution to the feature input space. Each partition may cover a set or cluster of data points retrieved from the combined data available to the induction method. Each partition may define zero, one or more rules and may optionally contain child partitions with their respective associated rules. The extracted partitions may incorporate overlapping and non-overlapping partitions. In the case of overlapping partitions, some priority function may be used to determine which partition to activate. Various methods may be implemented for finding the rules or clusters of data points pertaining to a rule, as long as each partition has sufficient data to fit a linear model and is not too complex such that a linear model may not perform well. Non-linear transformations including but not limited to polynomial expansion, Fourier transforms, continuous data bucketization, and other suitable conditional features may be applied to an individual partition. These non-linear transformations may be applied prior to the linear fit, to enhance model performance including transforms and corrections for rotational and scale invariance. It is further contemplated, that non-linear transformations may also be applied after the linear fit, in a manner that preserves explainability. A partition may be a cluster that groups data points optionally according to some rule and/or distance similarity function. Each partition may represent a concept, or a distinctive category of data. Partitions that are represented by exactly one rule have a linear model which may be modelled linearly, the coefficients of the linear model can be used to score the features by their importance. One or more partitions may also be merged together according to some suitable partition merge condition. Partitions may also be split into two or more partitions according to some suitable partition split condition. Partitions may contain additional information apart from the boundary information, including, but not limited to, observed and expected data distributions for data falling within the respective partition or set of partitions, meta-data, constraints on subsets or the entire set of the respective partition data, relationship data linking subsets or the entire set of the respective partition data to other subsets or the entire set of one or more partitions within the model and possibly also in other models in the case of multiple model fusion.

The partition information and feature attributions may be an output of the explainable encoder and explainable decoder or an XAED. The feature attributions $c$ may be coefficients to the input space and may illustrate the importance on each input feature. Hence, the feature attributions provide additional explainability by transforming the input space into an explainable input space. When an explainable autoencoder is connected to other deep learning systems, the input space may represent abstract features or concepts. In an exemplary embodiment, the input to an explainable autoencoder may be the output from a convolutional neural network (CNN) or CNN-XNN, such as an image.

In an exemplary embodiment where explainability is constructed in the encoder and the decoder, as shown in FIG. 4 (showing an XNN architecture) and FIG. 6 (showing an INN architecture), the output may be the feature attributions to the input space features and the feature attributions to the latent space. The feature attributions to the input space may be constructed using the encoder explainability architecture v. The feature attributions to the latent space may be constructed using the decoder architecture v'. Both v and v' may be an XAI, XNN, XTT, XRL, XSN, XMN, INN, or logically equivalent or similar architecture.

Figure 1:
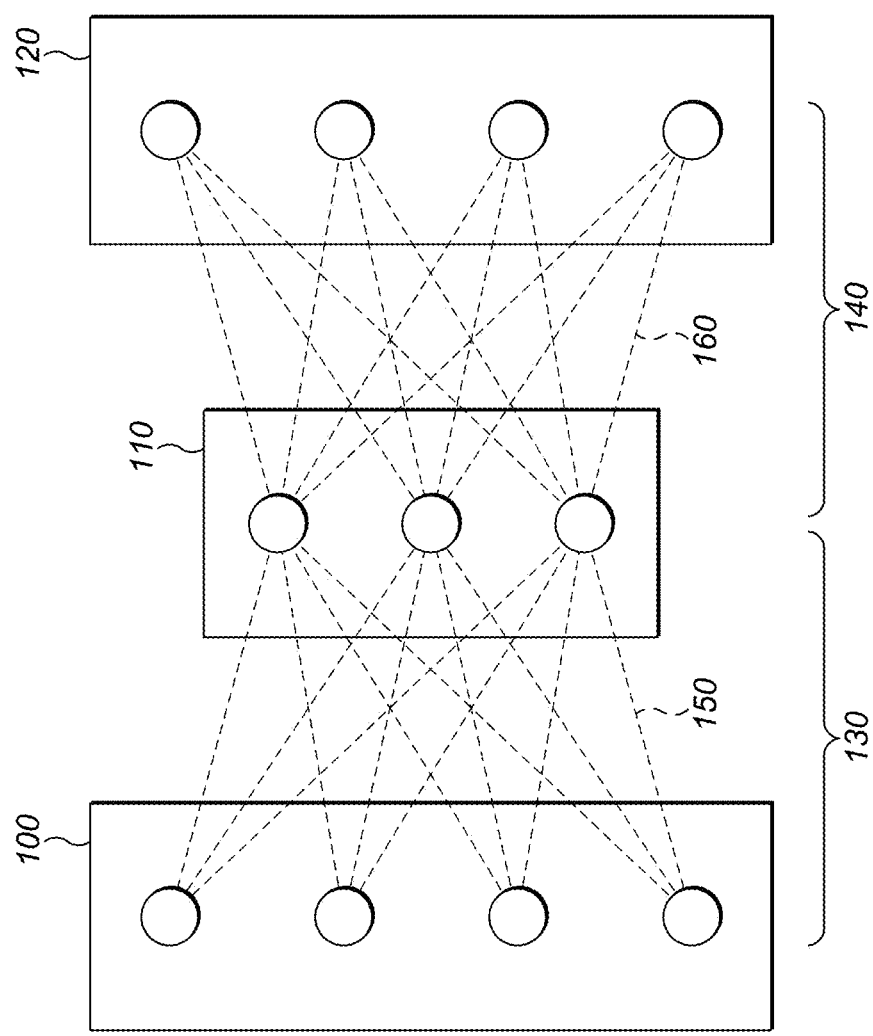
FIG. 1 is an exemplary embodiment of a prior art autoencoder architecture.
Figure 2:
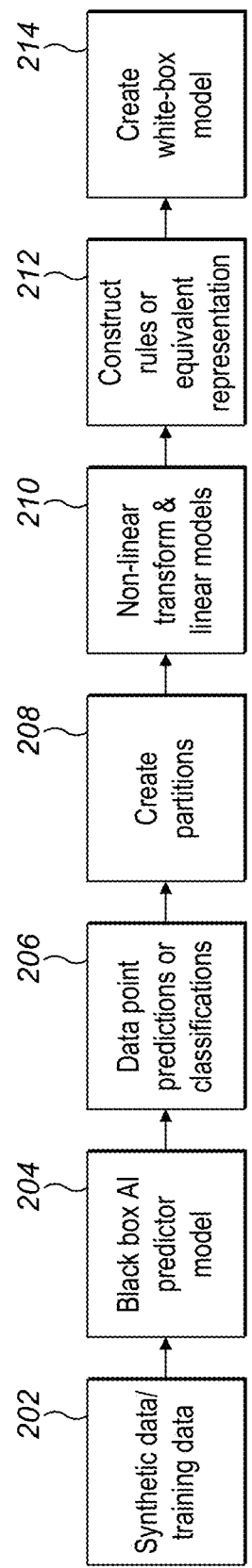
FIG. 2 is an exemplary schematic flowchart illustrating a white-box model induction method.

In an alternative embodiment, the partitions may be constructed externally with an induction process such as the method illustrated in FIG. 2. For example, the output may be the partition information of an exemplary system accompanied by the feature attribution of the XNN architecture or the INN architecture. Beyond local explainability with feature attributions, XNNs or INNs may also provide global explainability through the white-box nature of the architectures which may allow conversion to rules, and thus making the model human-readable and understandable. XNNs and/or INNs may also provide intermediate level of explainability through the hierarchical partition nature that allows explanations at different levels of detail and scale to be generated.

Referring now to exemplary FIG. 2, FIG. 2 may illustrate an exemplary method for extracting rules for an explainable white-box model of a machine learning algorithm from a black-box machine learning algorithm. Since a black-box machine learning algorithm cannot describe or explain its rules, it may be useful to extract those rules such that they may be implemented in a white-box explainable AI or neural network. In an exemplary first step, synthetic or training data may be created or obtained 202. Perturbated variations of the set of data may also be created so that a larger dataset may be obtained without increasing the need for additional data, thus saving resources. The data may then be loaded into the black-box system as an input 204. The black-box system may be a machine learning algorithm of any underlying architecture. In an exemplary embodiment, the machine learning algorithm may be a deep neural network (DNN). The black-box system may additionally contain non-linear modelled data. The underlying architecture and structure of the black box algorithm may not be important since it does not need to be analyzed directly. Instead, the training data may be loaded as input 204, and the output can be recorded as data point predictions or classifications 206. Since a large amount of broad data is loaded as input, the output data point predictions or classifications may provide a global view of the black box algorithm.

Still referring to exemplary FIG. 2, the method may continue by aggregating the data point predictions or classifications into hierarchical partitions 208. Rule conditions may be obtained from the hierarchical partitions. An external function defined by Partition(X) may identify the partitions. Partition(X) may be a function configured to partition similar data and may be used to create rules. The partitioning function may include a clustering algorithm such as k-means, entropy, or a mutual information-based method.

The hierarchical partitions may organize the output data points in a variety of ways. In an exemplary embodiment, the data points may be aggregated such that each partition represents a rule or a set of rules. The hierarchical partitions may then be modeled using mathematical transformations and linear models. Any transformation may be used. An exemplary embodiment may apply a polynomial expansion or some other transformations, including causal mappings. It is further contemplated, that the linear and/or non-linear transformation function may be a pipeline of transformations, including but not limited to polynomial expansions, rotations, dimensional and dimensionless scaling, Fourier transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, topological transforms of Kolmogorov/Frechet/Hausdorff/Tychonoff spaces, difference analysis and normalization/standardization of data. The transform function pipeline may further contain transforms that analyze sequences of data that are ordered according to the value of one or more variables, including temporally ordered data sequences.

Further, a linear fit model may be applied to the partitions 210. Additional functions and transformations may be applied prior to the linear fit depending on the application of the black box model, such as the SoftMax or sigmoid function. Other activation functions may also be applicable. The calculated linear models obtained from the partitions may be used to construct rules or some other logically equivalent representation 212.

Finally, the rules may be stored in an exemplary rule-based format. Storing the rules as such may allow the extracted model to be applied to any known programming language and may be applied to any computational device. Finally, the rules may be applied to the white box model 214. The white box model may store the rules of the black box model, allowing it to mimic the function of the black box model while simultaneously providing explanations that the black box model may not have provided. Further, the extracted white-box model may parallel the original black box model in performance, efficiency, and accuracy.

The output of the XGAN may be an explainable generator XG, the generated samples $XG_{samples}$ and multiple levels of explanations of the generator XG architecture; an explainable discriminator XD, the generated samples $G_{samples}$ from the black-box generator G and multiple levels of explanations of the discriminator architecture XD; or an explainable generator XG, an explainable discriminator XD, the generated samples $XG_{samples}$ and multiple levels of explanations of the generator architecture XG and the discriminator architecture XD.

An XGAN may generate multiple levels of explanations, which may include partitioning information, internal coefficients of the model and feature attributions of the input dataset. The explanations may be sent to the interpreter. The XGAN system may construct explanation scaffolding from the output produced by the explainable architecture of the generator XG and/or discriminator XD and use it to provide the results to the interpreter to assist in understanding how the model arrived at a prediction. An interpreter may be the end-user or a component within the XGAN system. It is further contemplated that the underlying components of an XGAN may update their states or internal information encoded within the XGAN via a combination of explanations and/or interpretations.

The partitioning of an exemplary explainable encoder and optionally for the explainable decoder may require an induction method such as the one described in FIG. 2 to be computed at least once. Alternatively, the partitions may need to be computed dynamically within the explainable autoencoder. If no partitions are used, an XNN or INN may be trained directly without any partitioning data. Alternatively, dynamic partitioning may also be utilized which may enable the creation of partitions to be defined and improved within an end-to-end deep learning system. In an exemplary embodiment, the XAED may implement a hierarchical partition structure with dynamic splitting and merging providing a practical means of adaptation to novel and/or previously unforeseen data, and to representing information at multiple levels of detail and scale factors.

Figure 7:
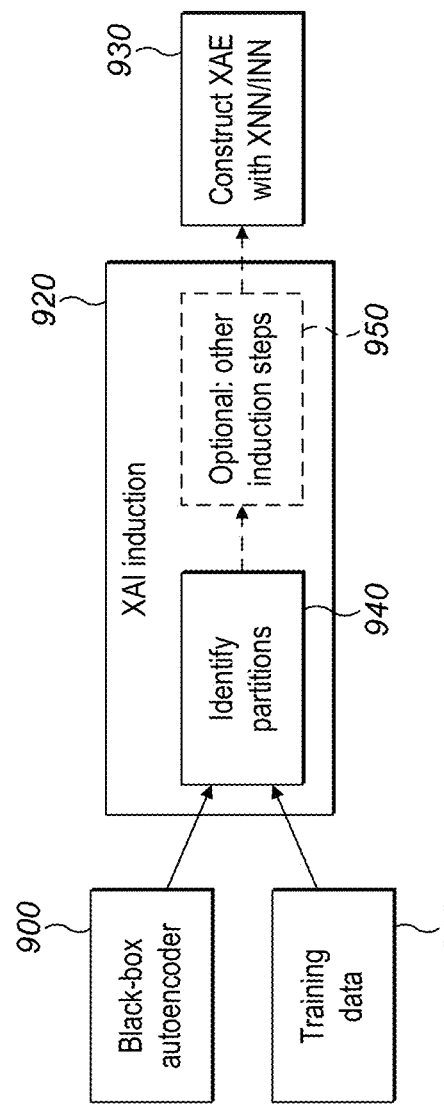
FIG. 7 is an exemplary embodiment of an explainable autoencoder with externally defined partitions.

Referring now to exemplary FIG. 7, FIG. 7 may illustrate an exemplary process by which an explainable autoencoder may be constructed with externally defined partitions. The partitioning of the explainable autoencoder embodiment may be either externally or dynamically constructed. A black-box autoencoder 900 and the corresponding training dataset 910 may be used by an XAI induction method or model, as shown in FIG. 7. The XAI induction method may identify partitions 940 and may produce a fully explainable model as output. An XAE 930 may be constructed based on the partitions 940 in the XAI model 920. It is further contemplated that optionally, the induction steps 950, may be used in conjunction with the XAI model 920 for the XAE 930 construction. The information of the partitions may be used as input to an XNN architecture to construct an explainable encoder and/or an explainable decoder.

Another exemplary embodiment may include dynamic partitions as part of the explainable model. For instance, dynamic partitions may be implemented through a custom loss function in an end-to-end deep learning system. An alternative embodiment may utilize XNNs or INNs without partitions, which would eliminate the need to define and extract partitions externally or dynamically.

An exemplary explainable autoencoder may include at least one explainable encoder, as illustrated in exemplary FIG. 3 and FIG. 5. The explainable encoder may create explanations corresponding to the input space with regards to the latent space and may construct an optimal latent space representation. The explanations may be achieved using architectures such as an XNN or INN in order to attribute partition information and feature attributes to the input feature space.

The optimal latent space layer may be identified by calculating the reconstruction loss between the reconstructed output and the input space and by using the loss to update the parameters of the neural network architecture using gradient descent methods, such as backpropagation. The reconstruction output may be the output of the decoder. In an exemplary embodiment, where a black box model is the input, the decoder of the black box model may be used, and the generated latent space may be used as the input. In an exemplary embodiment without a black-box predictor model as input, the decoder can be constructed either as an internal black-box model or an explainable decoder model. The generated latent space may be used as the input of the decoder to construct the reconstruction output. The reconstruction loss may be minimized by training the explainable autoencoder using techniques such as backpropagation.

In an exemplary explainable autoencoder embodiment, an explainable decoder may be implemented, as shown in FIG. 4 and FIG. 6, to construct an end-to-end explainable encoder and explainable decoder architecture. The explainable decoder may construct a reconstructed representation of the input space and may minimize the loss of such representation. This may be achieved using an algorithm such as backpropagation to tune the parameters of the decoder. The decoder may also create explanations to the latent space with regards to the reconstruction of the input space. The explanations may include partition information and feature attributions to the neurons in the latent space.

In an alternative embodiment, the system may include an exception whereby only the decoder is explainable, and the encoder is a black-box model. This embodiment may be implemented, for example, to identify the features in the latent space which are responsible for the majority of the reconstruction loss.

An exemplary explainable autoencoder may include local models. Each local model may be trained on a small area of the entire search space. The combination of local models may create a global model. An exemplary configuration is applicable to XNNs, INNs, and logically equivalent or similar architectures. Additionally, INNs may also be able to provide explanations without the need to construct any partitions by combining deep neural network transformations and/or relevance estimators.

The input of an exemplary explainable autoencoder may be defined as $XAED_{input}$. The coefficients of the local models may be extracted and combined with the feature dimensions d of $XAED_{input}$. The coefficients may be based on an explainable architecture v, where v is an explainable architecture such as an XNN, INN, and logically equivalent or similar architectures.

The decoder of the explainable autoencoder may be optionally implemented using an architecture v', where v' is an explainable architecture such as XNN or INN and logically equivalent or similar architectures. This exemplary architecture may enable the latent space z to obtain the coefficients for each neuron from the explainable architecture v'. The coefficients may enable explainability of the latent space z with respect to the reconstruction loss.

The explanations of the input space $XAED_{input}$ and the latent space z may include partition information of the local models that are constructed dynamically or by an external process that is utilized in the XNN or INN architecture. The partition information may include the partition boundaries and an explainable local model. The explanations may include the construction of feature attributions that are based on the extracted coefficients of the local models. Feature attributions may represent the importance of each factor in the feature space.

The explanations may be used to describe the trained encoder in order to identify any potential bias or to get insights on the most prominent features which are useful for compressing the input variables to a derived latent space. Explanations may be used to describe the latent space if the explainable decoder is in the architecture, to describe the prominent features that are affecting the reconstruction loss from the latent space.

Exemplary use cases for explanations may include anomaly detection and bias detection for latent space compression. In an exemplary embodiment, an explainable autoencoder may provide local explainability since feature attributions and partition information of each anomaly can be analyzed separately. An embodiment may also provide global explainability, as the feature attributions of multiple anomalies can be aggregated in order to analyze the general impact of coefficients on multiple anomalies and identify common features that are present for the anomalies. Additionally, global explainability may be achieved by converting the XNN model to a rule-based format which is machine and human-readable.

Figure 10:
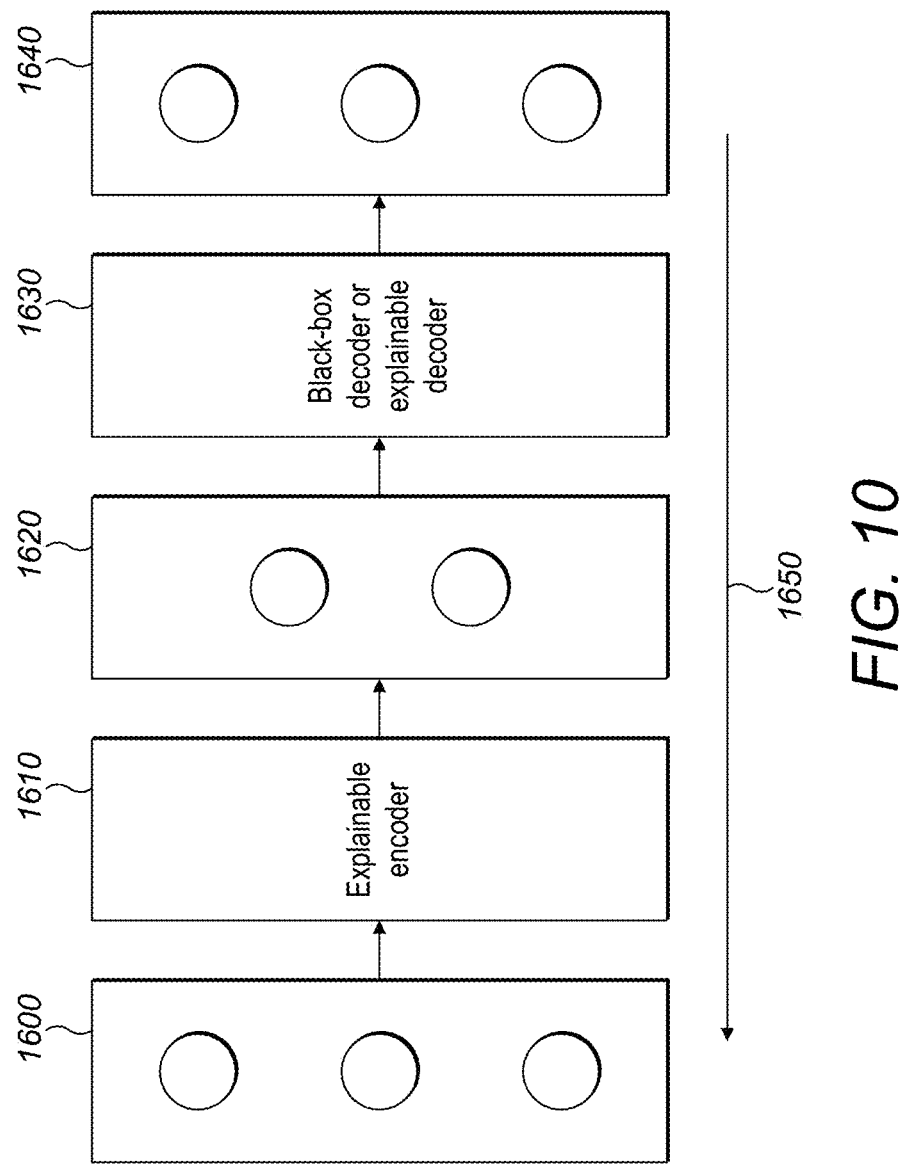
FIG. 10 is an exemplary embodiment illustrating anomaly detection.

An exemplary explainable autoencoder may be used for anomaly detection. For illustrative purposes, the exemplary explainable autoencoder depicted in FIG. 10 is configured to detect anomalies in Complete Blood Count (CBC) blood tests. The input space 1600 may include features such as red blood cell count, white blood cell count, and hematocrit values. An encoder with an explainable architecture 1610 may be trained on healthy patients, to construct latent space 1620. Anomalies may then be detected during the calculation of the reconstruction error, based on the reconstructed input 1640 and a threshold h. In an exemplary embodiment an autoencoder is only trained on the known class, and it may identify anomalies without the need to have prior training data points for anomalies. The feature attributions of the input feature space may provide explanations of the features which contributed to the anomaly.

Optionally, an explainable decoder 1630 may be trained to construct feature attributions to the latent space of the explainable autoencoder. The explanation may help a physician understanding the cause for such an anomaly by using an exemplary backmap process 1650 to trace the feature attributions of the explainable decoder 1630 back to the input features 1600. The feature attributions of the explainable decoder 1630 may be analyzed or combined with the feature attributions of the explainable encoder 1610, using a function $f$, to identify the relationship between the feature importance of the explainable encoder 1610 and the feature importance of the explainable decoder 1630.

In an alternative embodiment, the output from an explainable auto-encoder system may also be used to enhance reinforcement systems. The explanation data, such as feature attributions, may be used as part of the reward or penalty functions.

An exemplary embodiment may provide enhancement over prior art as the explainability may be constructed for all features based on the reconstruction loss, whereas prior art such as Antwarg et al. (2019) selects the top features with the highest reconstruction loss to construct explainability. An embodiment may be incorporated within the model itself and can pass the explainable results for further processing, such as backmap integration, while other prior art explainable techniques are post-hoc.

Bias may be identified globally by analyzing the architecture of the explainable encoder v or the architecture of the explainable decoder v', without the need to test new data. Alternatively, bias may also be detected locally for a specific sample or group of data. An exemplary embodiment may present methods for detecting bias both globally and locally by harnessing the white-box nature of the XAI and XNN architectures, and logically equivalent or similar architectures. It is further contemplated that grey-box architectures, such as INNs, may also be used for detecting bias.

Various methods for detecting the bias and weakness (and conversely, the strength) of the input space and the latent space z may be described. An exemplary embodiment may provide a global bias detection method which may use the coefficients of the encoder architecture v for the input space and the decoder architecture v' for the latent space to identify any potential bias, where v and v' are explainable architectures such as an XNN, INN and logically equivalent or similar architectures. An exemplary embodiment may use local feature importance as extracted from the rule-based model coefficients in order to identify any potential bias locally. An exemplary embodiment may aggregate the feature importance over the results/explanations of multiple samples. An exemplary embodiment may present the detecting of bias in multi-dimensional data such as images and videos. An exemplary embodiment may present the detection of bias in sequence data.

An explainable autoencoder embodiment may be used as an input to a supervised learning model. Referring now to exemplary FIG. 11, an exemplary embodiment of an XAE and XNN classifier with an encoding backmap may be illustrated. An explainable autoencoder XAED may be trained using the training data 1700. The encoder component 1710 of the trained XAED, may then be used to generate the input space 1720 for a supervised learning task 1730. The explainable encoder 1710 may explain the contribution of the feature attributions of the input space 1700 with regards to the latent space 1720.

Figure 11:
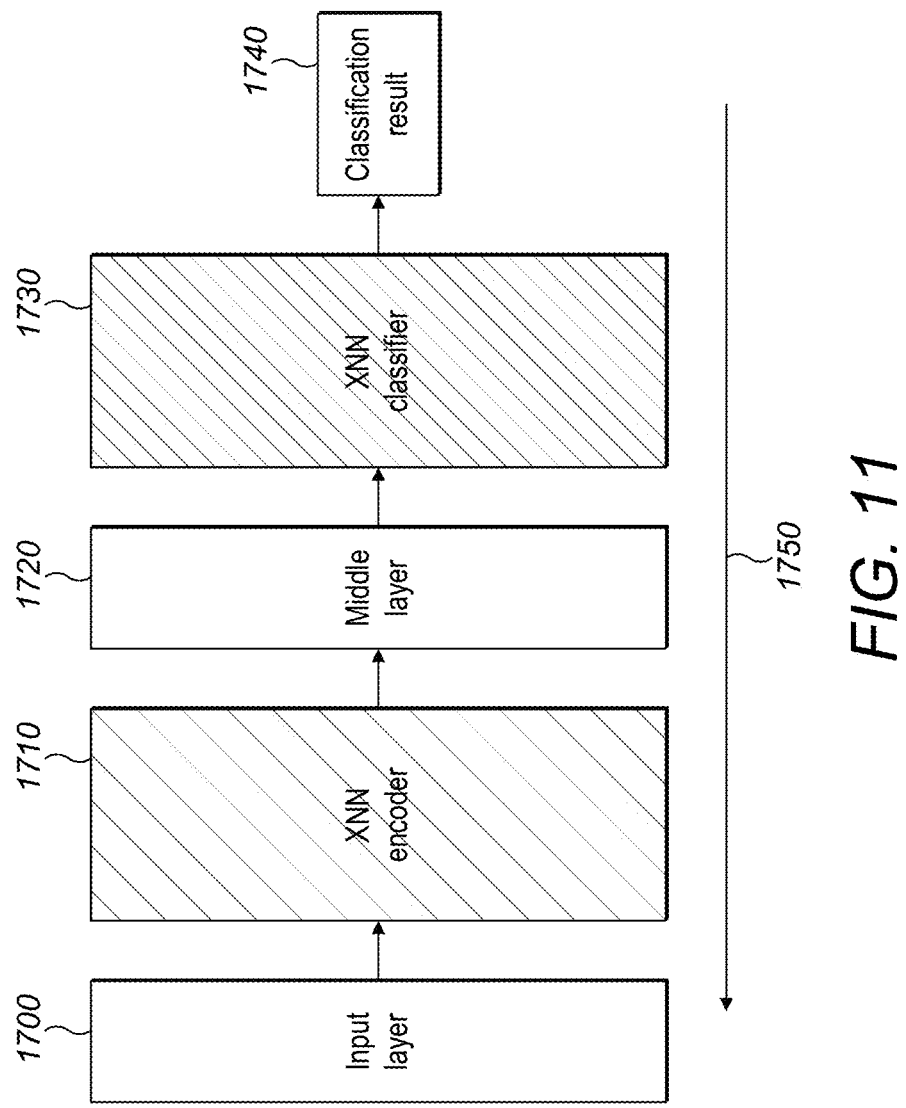
FIG. 11 is an exemplary embodiment of an XAE and XNN Classifier with Encoding Backmap.

The Backmap process 1750 may be used to trace the feature attributions of the XNN classifier 1730 back to the input layer of the explainable autoencoder, as illustrated in FIG. 11. The feature attributions of the XNN Encoder 1710 may be analyzed or combined with the feature attributions of the XNN classifier 1730, using a function $f$, to identify the relationship between the feature importance of the explainable encoder 1710 and the feature importance of the XNN classifier 1730.

An exemplary embodiment may be used for breast cancer classification. The independent variables of the breast cancer dataset may be inserted in the explainable autoencoder in order to construct distinctive features, in the latent space. The distinctive features in the latent space of the autoencoder, may be used as input to the XNN classifier 1730, and may result in a better classification performance based on the results of the classification 1740. The architecture prior to the explainable autoencoder embodiment may be a blackbox procedure. The explainable autoencoder may convert this procedure into a white-box model and generates the contribution of the independent variables in relation to the encoded input feature space using the feature attributions of the explainable encoder architecture.

Figure 8:
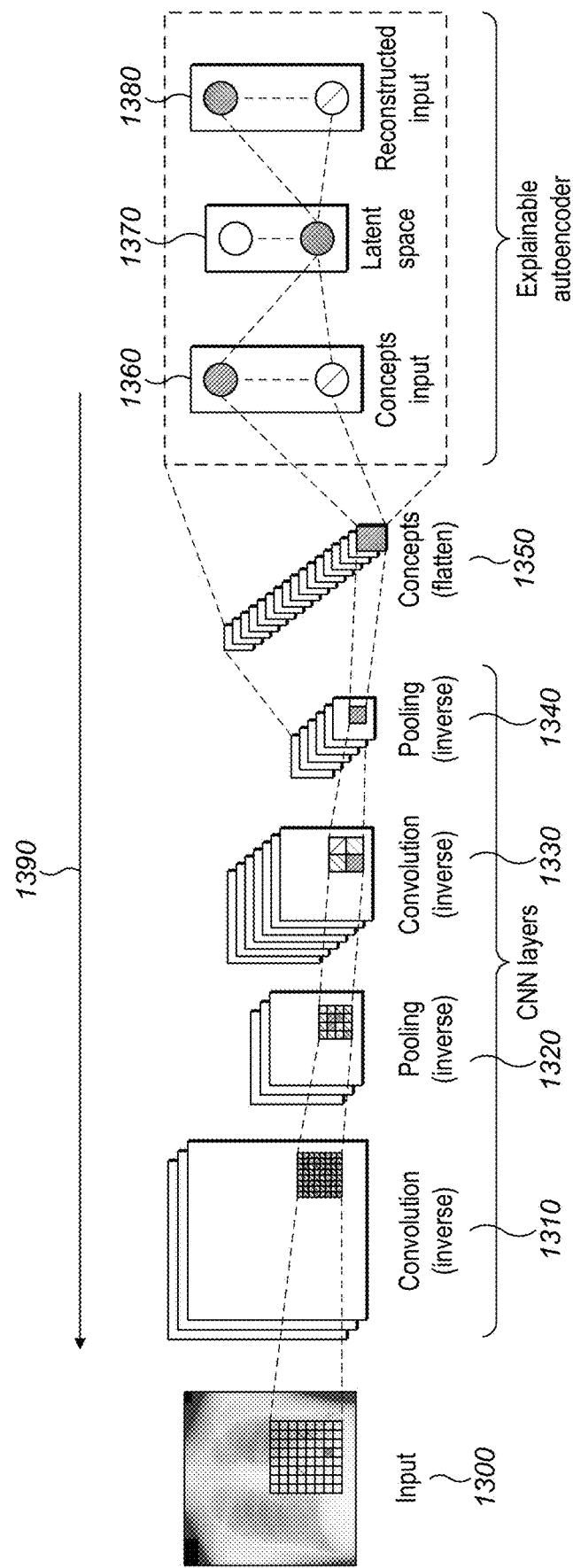
FIG. 8 is an exemplary embodiment of a backmap with an explainable autoencoder.

Referring now to FIG. 8, FIG. 8 may illustrate an exemplary explainable autoencoder implementing an inverse indexing mechanism. As an example, an X-Ray image is used as input 1300 to the system. The underlying architecture deriving the input space of the XAED may be a convolutional neural network (CNN) and the explainable autoencoder may be the final component of the architecture. For example, the XAED may be integrated as a component after the final flatten layer 1350 of an exemplary CNN, to train a latent space 1370 and reconstruct the input 1380. Explanations using an exemplary architecture may be extracted using an encoding backmap.

The input space of an explainable autoencoder XAED 1360 may refer to the feature space of the flatten layer 1350 in an exemplary deep learning architecture. An exemplary deep learning architecture may be trained on normal X-ray images. An explainable encoder may construct feature attributions to the input layer of the explainable autoencoder 1360. The feature attributions may be mapped to the input image 1300 of the CNN architecture, using Backmap 1390, by inverse pooling 1320 1340 and inverse convolution 1310 1330 operations, in order to highlight the pixels importance in the image 1300 as defined by the explainable architecture v, where v∈{XAI, XNN, XTT, XRL, XSN, XMN, INN} or logically equivalent or similar architectures. Additional iterations of inverse pooling 1340 and inverse convolution 1330 may be implemented. In an example, reconstruction loss above a threshold h may indicate that the input x-ray image 1300 depicts a certain condition, such as pneumonia. The feature attributions of the detected anomalies may be mapped to the input image to, for example, construct a heatmap on the input image 1300.

The heatmap may identify which regions are important, which may facilitate model verification and bias detection. For reference, unstandardized, or "raw," feature attribution, which may be derived from the coefficient, may represent the amount of change in a dependent variable based on the amount of change in an independent variable. The feature attributions extracted from v or v' may correspond to the degree to which there is a change in colors at each zone of the input, which may, in one exemplary application scenario, indicate the presence of pneumonia in the x-ray image.

An exemplary explainable autoencoder may be utilized in videos since a video is essentially constructed as a sequence of images. In this exemplary embodiment, a data analyst may analyze the feature attributions of each frame in order to detect the importance of the features in the frame. A filter or pooling layer in a convolutional neural network may also be applied at each given frame. The analysis of each frame may be aggregated to provide insights on the video as a whole.

An exemplary XAED and/or XGAN system may provide for the injection of human defined knowledge in the latent space. Human defined knowledge may be expressed as a knowledge graph KG. Exemplary knowledge graph KG may include nodes $KG_n$, which describe human defined entities, and edges $KG_e$, which describe the relationship between nodes. Each node in a knowledge graph may include one or more taxonomy identifiers that contribute to the classification of the knowledge in the knowledge graph. A taxonomy or ontology T 1415 may be a means of organizing objects, concepts, and symbols in a structured manner, generally following a hierarchical format and may identify relations between the objects, concepts, and symbols. An exemplary taxonomy identifier may enable multiple knowledge graphs to be fused together. It may be noted that a knowledge graph may utilize multiple taxonomies $KG_T = \{T_i, \ldots, T_n\}$. It is further contemplated that an ontology can also supplement taxonomies and that parts of an Explanation Scaffolding and/or Interpretation Scaffolding can be used to supplement the XAED implementation.

An example of a medical knowledge graph KG may include nodes which refer to symptoms. The nodes may include entities such as dizziness, fatigue, and irritability. KG may also includes nodes which refer to the conditions, which may include entities such as Anemia and heart disease. The nodes that are of type symptom may not be fully connected to the nodes of type condition, as only a subset of symptoms lead to a certain condition and each condition may have its own set of symptoms.

Figure 9:
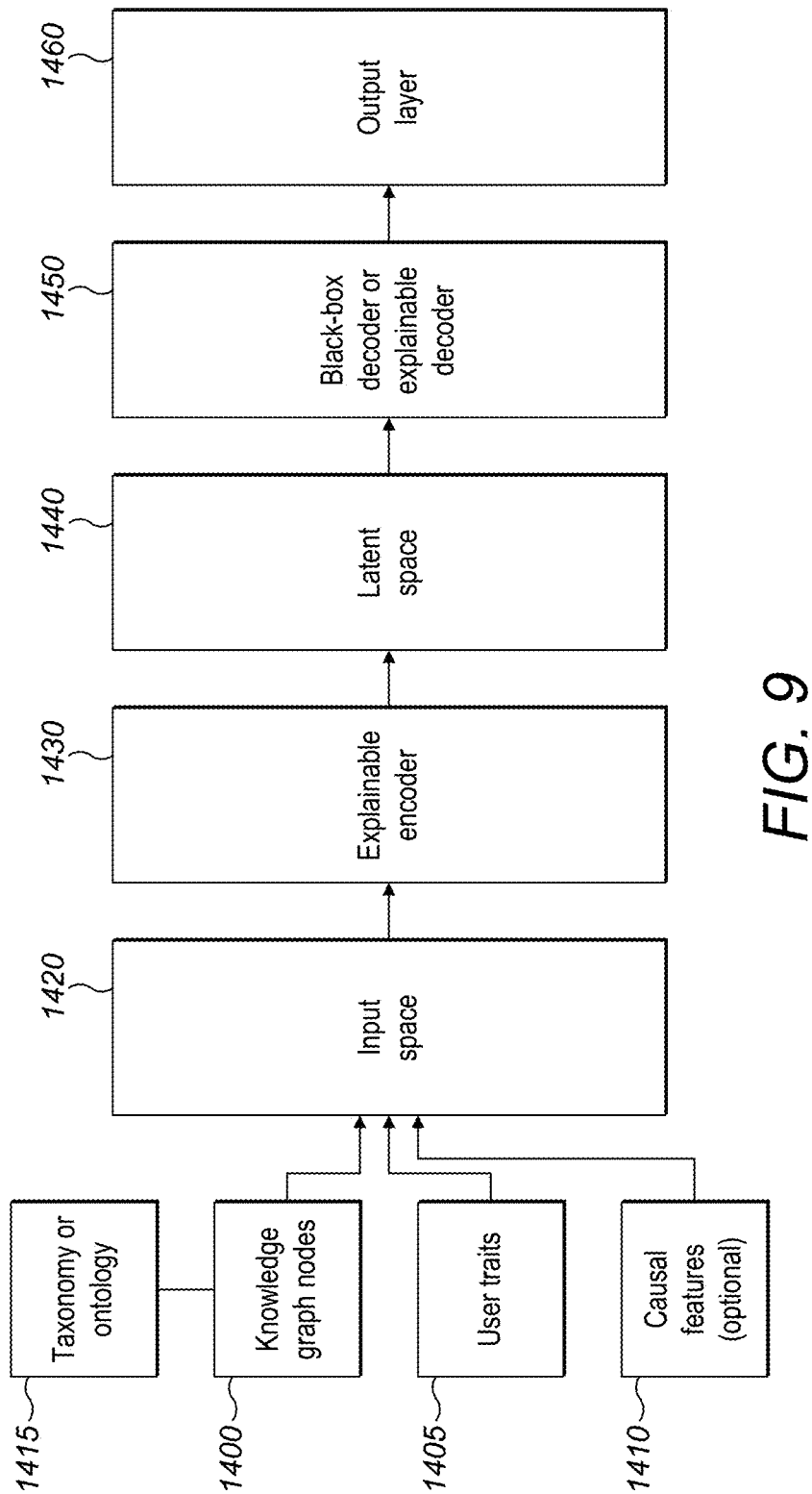
FIG. 9 is an exemplary embodiment of human knowledge injection in an explainable autoencoder.

An exemplary embodiment may implement Human Knowledge Injection (HKI). A knowledge graph KG may be injected in the explainable autoencoder XAED, as shown in exemplary FIG. 9. The input space 1420 may incorporate the nodes representing the symptoms 1400 and the latent space may incorporate the nodes representing the conditions 1440. The input space 1420 and the latent space 1440 may not be fully connected and may be constructed using an explainable encoder XG 1430. The latent space 1440 and the reconstructed input 1460 may not be fully connected. The reconstructed input 1460 may be constructed using an explainable decoder 1450. The connections in the XAED may represent the connections that are present in the knowledge graph KG.

The input for the nodes 1400 in the XAED embodiment may include a numerical value in order to represent the scale of each symptom. The input space 1420 may include additional features that are not present in the knowledge graph KG, such as patient information or another user information 1405. In an exemplary embodiment for medical diagnosis, the input of the XAED may include user information, which may be data such as red blood cell count, white blood cell count and hematocrit values of a patient. Exemplary features may be fully connected to the latent space since features may be available for each person.

Figure 12:
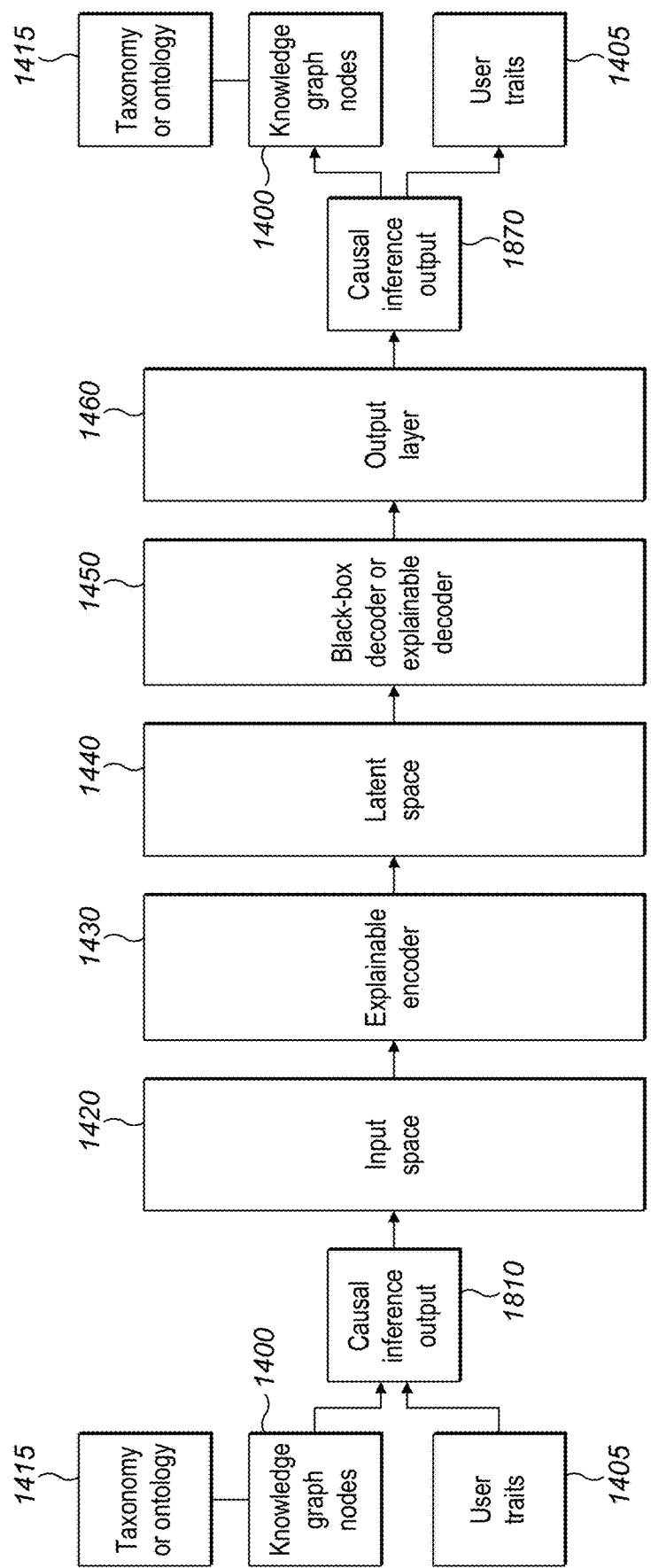
FIG. 12 is an exemplary embodiment illustrating causal human knowledge injection in an explainable autoencoder.

The input features can be analyzed for causation 1410. The causal output may be used as an additional input 1410 to the explainable autoencoder XAED. In an alternative embodiment, the output of causation inference may be solely used as the input 1810 to the explainable autoencoder, as shown in FIG. 12. An exemplary embodiment may reconstruct the output as causal inference output 1870. Causal inference may measure the effect of causes on specific units. An example of causal inference may include medical causes t and c. The output variable y of a causal inference may measure the effect of the causes on a patient u, and can be illustrated as $y_{t(u)}$ and $y_{c(u)}$. The effect of the cause t on a patient u relative to cause c on a patient u can be measured by $Y_t(u)-Y_c(u)$.

An Explainable Structural Causal Model (XSCM) may be practically implemented by fundamentally changing a structural causal model (SCM) with a modification to the computation of the structural equations $f$. Unlike (Kocaoglu et al., 2017), instead of the black-box feed forward neural network, the structural equations $f$ in a XSCM are computed using an explainable architecture x, where $x \in \{XAI, XNN, XTT, XRL, XGAN, XAED, XSN, XMN, INN\}$ or logically equivalent or similar architectures. XSCM constructs global and local explainability that may include the detection of bias between causal variables in an explainable structural causal model XSCM. The explainable structural causal model XSCM may be integrated in any algorithm that includes a structural causal model SCM, and replacing SCM with XSCM in such algorithm gives explanation capabilities to the resulting system in a seamless manner, providing a straightforward manner to retrofit and enhance existing SCM based implementations with the unique benefits of this invention.

The utilization of an explainable architecture for the computation of the structural equations $f$ enables explainable relationships between the exogenous variables U and the endogenous variables V. Such explainable relationships between causal variables are not possible when using black-box models in a structural causal model such as in (Kocaoglu et al, 2017). The use of white-box models also enables integration of Human Knowledge Injection and collaborative knowledge discovery methods to be seamlessly fused with results obtained in supervised or unsupervised modes in the discovery of the structural equations $f$. Human knowledge injection (HKI), system knowledge injection and collaborative knowledge discovery methods are another type of input for the computation of the structural equations $f$. The coefficients θ of the explainable architecture x within a structural equation may be modified to enforce specific rules. It is further contemplated that an Explanation Structure Model (ESM) may be utilized in an XAED and/or XGAN system implementation. ESMs include four main parts: (i.) an explainable model, such as an XNN, XTT, XAED, XGAN, or other suitable explainable models; (ii.) a Statistical Structural Model (SSM) that models statistical relationships; (iii.) Causal Structural Model (CSM) that models causal relationships and that may be implemented by an XSCM or Explainable Generative Adversarial Imitation Learning (XGAIL) model or other suitable causal models; and (iv.) Symbolic Structural Model (SSM) that models symbolic and logical relationships and that may be implemented in the form of rules, symbolic logic, or some suitable formal language.

In an exemplary embodiment, an XAED and/or XGAN may use an XSCM to learn a pre-defined causal graph. The XAED auto-encoder or XGAN generator may be used to implement experience replay type of learning that is not based on standard reinforcement learning techniques. An XAED and/or XGAN implementing an XGAIL system may also utilize the XGAIL simulator and simulator constraint components to further create experience data. An experience dataset may subsequently be used to train the structural equations $f$ of an explainable structural causal model XSM.

The computation of the structural equations $f$ in an explainable structural causal model XSCM may be computed using an explainable architecture x, where $x \in \{XAI, XNN, XTT, XRL, XGAN, XAED, XSN, XMN, INN\}$ or logically equivalent or similar architectures. An explainable architecture may construct multiple types of model interpretation to better understand the context $\vec{u}$ and cause of an event δ in the explainable structural causal model XSCM. The context $\vec{u}$ may refer to the unique values of the exogenous variables in the explainable structural causal model. The cause of an event δ may refer to a set of endogenous values V that cause an event δ to occur, such that there exists another set of endogenous values V in which event δ does not occur.

There may be three types of exemplary model interpretation that can be output by an XSCM system: basic interpretation, explanatory interpretation, and meta-explanatory interpretation. A basic interpretation may refer to a prediction output o that can be understood by the sub-component. An explanatory interpretation is represented by a 2-tuple vector <o, w> which may refer to a prediction output o combined with a model explanation w for such predicted value, that can be understood by the sub-component. A model explanation may include coefficients θ of the explainable architecture x that may be utilized to explain the feature importance of the input features for a given observation. A meta-explanatory interpretation may be represented by a 3-tuple vector <o, w, j> and may contain the prediction output o, the model explanation w and justification of the model explanation j. The model justification j provides additional information about the assumptions, processes and decisions taken by the explanation system that were taken into consideration to produce the model explanation.

A combination of XGAN and/or XAED system may enable explainable information that is generated from explainable architectures to be incorporated within a behavioral model framework in order to enable constraints, triggers, events, and actions to be set on such explainable information.

A behavioral model framework may include an explainable architecture x. Input constraints may be included during the formal verification of the explainable architecture of such behavioral model. Input constraints may be based on the internal coefficients of the white-box model, or the feature attributions constructed for the input dimensions of observation o. Feature attributions may identify the importance of a given feature with respect to the result. Hence, explainable architectures extend the verification process of behavioral modeling by allowing additional constraints to be designed on feature attributions in order to formally verify the white-box model for potential bias detection in the system.

In an exemplary embodiment, a combination of an XAED and/or XGAN system may be incorporated in a Behavioral Model (BM) framework. A behavioral model BM may allow for fusion of conditional constraints in order for the activation of a trigger t, hence multiple conditional constraints may be based on the graphical causal model in an XAED and/or XGAN embodiment. An event may be fired upon the activation of the conditional constraints for a particular trigger within the behavioral model to execute a terminal action or a feedback action to update internal coefficients of a causal model, update internal coefficients of an explainable architecture x, or update a sub-component within the behavioral model BM.

In an exemplary XAED and/or XGAN system, a BM can be flexibly incorporated via a combination of constraints, together with any combination of their transitions, in any order. It may be contemplated that an exemplary embodiment may implement any other contemplated reinforcement learning technique, process, or component. Behavioral models are used herein for illustrative purposes. It may be contemplated that an exemplary embodiment may implement any suitable equivalent. For example, the use of BMs may be flexibly substituted with a behavioral model hierarchy (BMH). Any reference to a BM can be substituted with a BMH and vice-versa.

It is further contemplated that a combination of BMs and XAEDs/XGANs provides further assurance and guarantees of behavior that add to the trustworthiness and auditability of XAED/XGAN systems. It is also further contemplated that BMs may provide a practical solution for XAED/XGAN in the face of environments that provide partial observations.

The causal features in a graphical causal model G 1410 may have conditional constraints $G_c$ using a behavior modeling architecture BM, where $C=\{c_1, \ldots, c_n\}$, set on the values of $G_N$, such that if the values exceed a certain threshold h, an event e is fired to activate a trigger t. The trigger t may execute a terminal action or a feedback action to update internal coefficients of a causal model, update internal coefficients of an explainable architecture x, where $x \in \{XAI, XNN, XTT, XRL, XSN, XMN\}$ or logically equivalent or similar architectures, or update a sub-component within the behavioral model BM.

The explainable autoencoder XAED may explain the cause of a condition in the latent space by utilizing the feature attributions of the encoder architecture v, where v may be an XNN, INN, or logically equivalent or similar architecture. Through the white-box nature of an exemplary rule-based explainable architecture, a data analyst may inspect any potential bias by inspecting the feature attributions of the input space that may contain a feature with the highest bias. The decoder v' may be a black-box or an explainable architecture such as an XNN, INN, or logically equivalent or similar architecture. A normalization may also be applied on the resulting feature importance.

An exemplary embodiment may be integrated within a deep learning architecture, as a component, to construct feature explainability to the input space of an exemplary explainable autoencoder. Such an embodiment may be implemented in, for example, time series deep learning architectures such as a Gated Recurrent Unit (GRU), Recurrent Neural Network (RNN), Long short-term memory (LSTM) and in transformers.

An exemplary XAED embodiment may include an encoder-decoder RNN architecture. An RNN architecture may be a feed forward neural network rolled out over time that uses sequence data. An embodiment may include the initial hidden state $h_0$, a number of hidden states $h_1 \ldots h_t$, the input vector q, the weights w that is shared across the model and the output at each hidden layer $y_1 \ldots y_t$.

A hidden state may be defined as $h_t = f(W_{hh}h_t-1+W_{qh}q_t)$, where $W_{hh}h_t$ represents the weights applied to the previous hidden state and $W_{qh}q_t$ represents the weights applied to the input at timestamp t. The hyperbolic tangent may be a commonly used function in an exemplary RNN architecture. The final hidden state $h_t$ may be the latent space z of the encoder-decoder RNN architecture. The latent space may then be input to an RNN architecture that predicts the output at timestamp t. The decoder may compute the output y from the hidden state using an activation function such as $y_t$=softmax $(W_s h_t)$, where the respective weight may be applied to the current hidden state $h_t$. The softmax function may create a probability vector in order to determine the output.

An exemplary explainable autoencoder embodiment may incorporate the input vector in order to encode it into the latent space by harnessing the white-box nature of XAI, XNN, and like architectures in the encoder part of the model. Explainable architectures may construct feature attributions c to the input space. The feature attributions c may facilitate model verification or bias detection.

Figure 13:
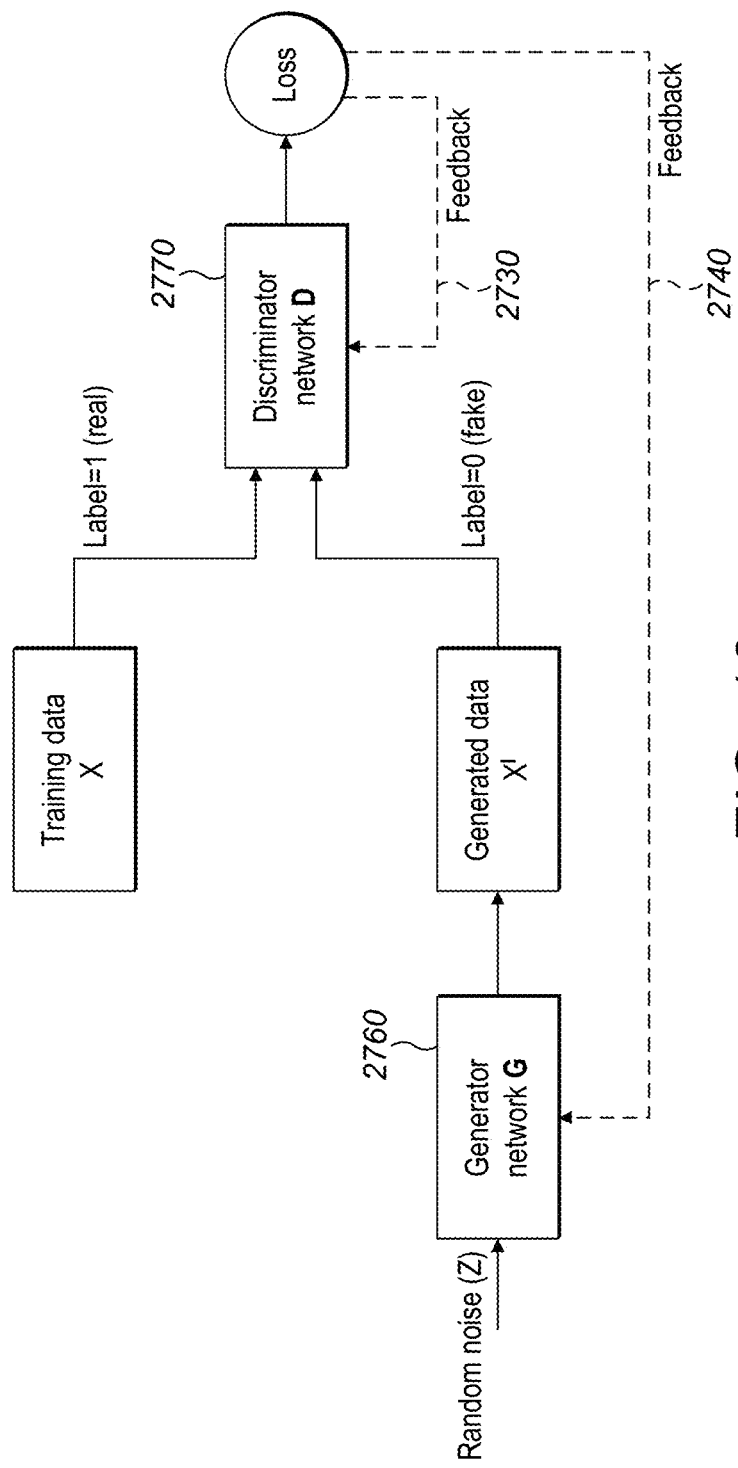
FIG. 13 is an exemplary embodiment of an architecture of the prior art generative adversarial network.

A standard generative adversarial network (GAN), as shown in FIG. 13, may include a generator model G 2760 and a discriminator model D 2770. The models G and D may compete against each other in a minimax game theory scenario, in order for the generator G to be able to produce realistic samples that are able to fool the discriminator D into determining that the samples were retrieved from the training dataset. G and D may use the feedback from the output of the loss function 2730 2740 to find an optimal architecture. The standard GAN architecture has produced excellent results in multiple fields of artificial intelligence. However, typical GAN architectures utilize a generator G and a discriminator D which are black-box models and not interpretable by an interpreter and thus the results of such architectures are not explainable. There have been attempts to introduce some element explainability to generative adversarial networks, such as xAI-GAN (Graves and Nagisetty et al., 2020) (xAI-GAN was previously known as LogicGAN when originally posted on Feb. 24, 2020 but was renamed to xAI-GAN in Oct. 26, 2020 and the order of the authors is changed in some versions of the paper), however these mentioned approaches (Graves and Nagisetty et al., 2020) do not construct a white-box interpretable model, and instead only guide the gradient using the importance of the features.

An exemplary embodiment provides an explainable generative adversarial network (XGAN). There may be multiple variations of the XGAN architecture. An XGAN architecture may include an explainable generator architecture XG(z) 2710 and a black-box discriminator architecture D(x). In one exemplary XGAN architecture, the sole explainable model may be the explainable generator architecture XG while the other components of the XGAN architecture may be the standard black-box components. The input of an explainable generator architecture XG (z) may include noise vectors z, conditional vectors e and the black-box generator G model. The noise vectors z may be sampled from a defined prior distribution. The conditional vectors e may be utilized to control the generated samples for a specific conditional statement. The black-box generator G model may be utilized to induce the explainable generator architecture XG(z). In this exemplary XGAN architecture, the input of the black box discriminator, or optionally a white-box discriminator, may include explanations 2500 generated from the explainable generator architecture.

An XGAN architecture may include an explainable discriminator architecture XD 2720 and a black-box generator architecture G. In this exemplary XGAN architecture, the sole explainable model may be XD 2720 and the other components of the XGAN architecture may be the standard black-box components. The input to the explainable discriminator architecture XD may include conditional vectors e, samples from the training dataset and samples generated from the black-box generator G. The conditional vectors e may be used to constrain the generated samples of the XGAN architecture to a particular conditional statement. The XD architecture generates explanations of the partitions and feature attributions of the input dimensions in an exemplary explainable architecture. In an exemplary XGAN architecture, bias may be detected and explained on the input images that are generated from the generator G. For example, the detected bias may provide explanations on how the explainable discriminator XD was unable to distinguish the generated samples from the real training dataset. The detected bias, feature attributions and partition related explanations may be utilized as a feedback input 2600 to an explainable generator XG or a black-box generator G to tune and construct more realistic samples.

Figure 14:
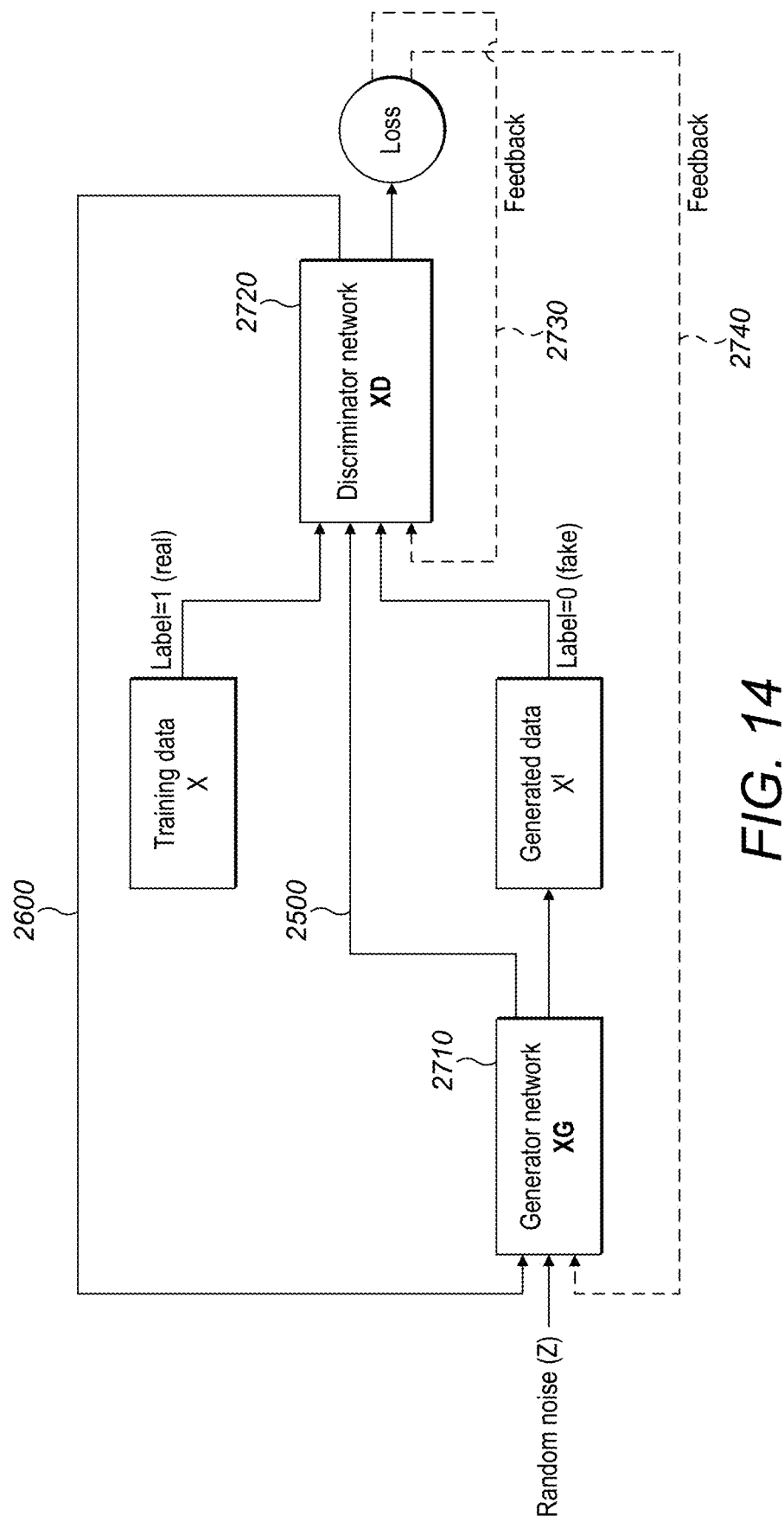
FIG. 14 is an exemplary embodiment of an architecture of a fully explainable generative adversarial network.

An XGAN architecture may include an explainable generator XG and an explainable discriminator XD, as shown in FIG. 14. In this exemplary XGAN architecture, the generator and the discriminator are an explainable architecture x, where x∈{XAI, XNN, XTT, XRL, XSN, XMN, INN} or logically equivalent or similar architectures. The explainable generator architecture XG may accept noise vectors z, which are sampled from an existing dataset, and conditional vectors e in order to control the generated samples for a particular conditional constraint. The explainable discriminator architecture XD may accept conditional vectors e, in order to constrain the XGAN architecture to a particular conditional statement, such as samples from the training dataset and samples generated from the black-box generator G. The XD architecture may generate explanations of the partitions and feature attributions of the input dimensions in an explainable architecture. In this exemplary XGAN architecture, bias may be detected and explained on the input images that are generated from the generator G. The detected bias may provide explanations on how the explainable discriminator XD was unable to distinguish the generated samples from the real training dataset. The detected bias, feature attributions and partition related explanations may be utilized as a feedback input 2600, as shown in FIG. 14, to the explainable generator XG, or a black-box generator G, to tune and construct better samples. In an exemplary XGAN architecture, the input of the explainable discriminator architecture may include explanations 2500 generated from the explainable generator architecture.

Figure 15:
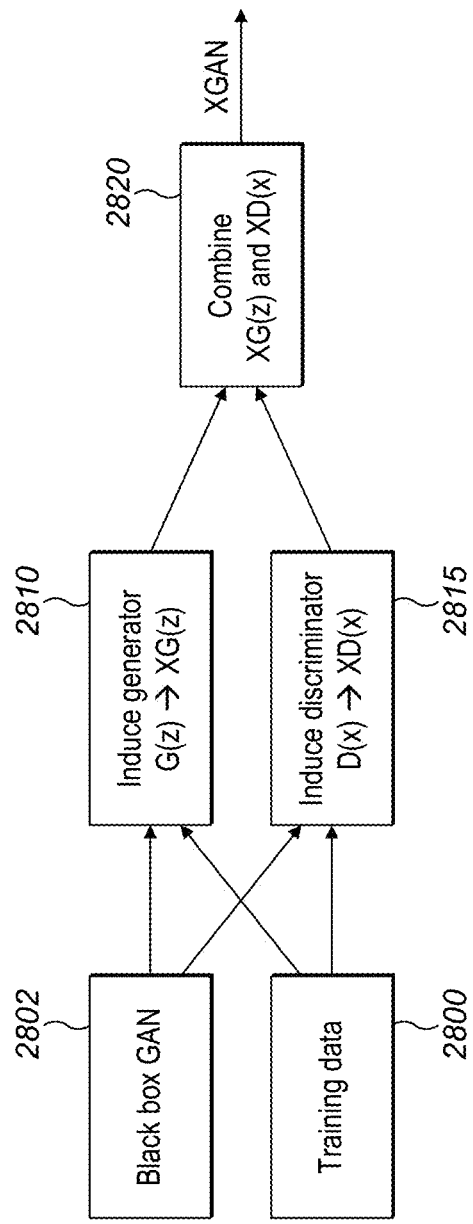
FIG. 15 is an exemplary illustration of an XGAN learning process.

Referring now to the exemplary embodiment in FIG. 15, the explainable generator XG 2810 may be induced using training data 2800, a black-box generator G 2802 or using a black-box discriminator D. The explainable generator XG 2810 may be induced by using the G architecture and by minimizing the residuals of G and XG during the training of XG. The explainable generator XG 2810 can also be induced using the black-box discriminator D architecture by using the output of the discriminator D to train the explainable generator XG. The explainable discriminator XD 2815 may be induced using the black-box discriminator D, by minimizing the loss of the output of D and the output of XD. The explainable generator and discriminator may be combined 2820, to construct the XGAN architecture.

An explainable generator architecture may include additional parameters e as input and may be described as XG(z, e). The additional parameters e may refer to conditional variables that condition the generated samples to follow certain defined constraints. The parameters e may optionally be an input to a black-box discriminator architecture D. The parameters e may optionally be an input to the explainable discriminator architecture XD. Some exemplary parameters e may include a one-hot vector of the class labels (Mirza et al., 2014), a causal controller vector (Kocaoglu M., 2017), the bottleneck layer of a black-box autoencoder architecture or the bottleneck layer of an explainable autoencoder architecture.

The explainable generative adversarial architectures may generate multiple levels of explanations, which may include partitioning information, internal coefficients of the model and feature attributions of the input dataset. The explanations may be provided to the interpreter. The explanations may be in a textual or numeric format which may represent the importance of the input dimensions or the bias in the given input dimensions.

Conditional features in XGANs may be handled more efficiently, via lossless explanations based on interpretable latent spaces, and practically than in a standard non-explainable GAN, which relies on uninterpretable latent spaces. Conditional XGANs (CXGANs) may utilize a class selection input parameter to an XGAN to enable it to generate explainable output corresponding to multiple different output classes.

Bias detected may be applied directly on the explainable generator XG, and optionally on the explainable discriminator XD, without the need to use any dataset for testing the bias. This may be implemented via the linear or non-linear equations which are available in the rule-based model (XAI Model) or any logically equivalent methods such as an XNN, XTT, INN, XSN, XMN and other suitably equivalent implementation methods. In the linear or non-linear equation, lists of features may be extracted with their corresponding coefficients which may represent the feature importance for that given model or set of rules.

A coefficient matrix C in an explainable model may be analyzed directly in order to extract the most important feature per rule/partition in the model defined by F(X). In an alternative embodiment, the matrix of coefficients may be aggregated such that the vector I represents the aggregated importance of each feature from all j rules such that I={$\theta_0$, . . . , $\theta_i$, . . . , $\theta_{k-1}$}, where $\theta_i = \Sigma_{p=0}^{j-1} C_{p,i}$, and $C_{p,i}$ identifies the ith coefficient of the pth partition or rule. Finally, let Is={$F_0$, . . . , $F_s$, . . . , $F_{k-1}$} represent a sorted vector with all elements of I where s represents the sort index, such that $F_{s-1} \geq F_s \geq F_{s+1}$. A map vector M may also be used to link the sorted coefficient index s with the transformed feature index k. Through the white-box nature of the rule-based XAI model, a user may then be able to inspect for any potential bias by inspecting the contents of the sorted feature importance vector $F_s$ whereby $F_0$ and $M_0$ may contain the feature with the highest bias. A normalization may also be applied on the resulting feature importance vector or matrix. In an exemplary embodiment, the F and M vectors may be used to create appropriate reports and analyses of bias and their sources and may also be inputs to formulate a strategy for bias reduction, mitigation, or elimination either via supervised, unsupervised, or semi-supervised means.

In an alternative embodiment, the F and M vectors may be used as input to a feature discovery and model discovery method that utilizes this information in perfecting its strategy and/or as an additional input parameter that allows the feature discovery and model discovery method suggest, and optionally, execute, structural changes to the AI model. In an exemplary embodiment, the bias information may be used to focus a GA or MCSM system on specific parts of an XNN/XSN/XMN that exhibits bias, rules in an XAI model that may be causing bias, the attention model of an XTT that exhibits bias, or actions taken by an XRL agent that may be causing bias under some policy.

Local bias detection may be applied to a specific sample. The answer, along with its explanation coefficients, may serve as the basis for localized bias detection. Referring to an exemplary model, a specific input sample may have two inputs, in this exemplary case x and y. Given the following ruleset as an example:

$$f(x, y) = \begin{cases} \text{Sigmoid}(\beta_0 + \beta_1 x + \beta_2 y + \beta_3 xy), & x \le 10 \\ \text{Sigmoid}(\beta_4 + \beta_5 xy), & x > 10 \land x \le 20 \\ \text{Sigmoid}(\beta_6 + \beta_7 x^2 + \beta_8 y^2), & x > 20 \land y \le 15 \\ \text{Sigmoid}(\beta_9 + \beta_{10} y), & x > 20 \land y > 15 \end{cases}$$

a feature importance vector/may represent the feature importance in a global manner such that $I=\{\beta_1, \beta_2+\beta_{10}, \beta_3+\beta_5, \beta_7, \beta_8\}$, corresponding to the features $\{x, y, xy, x^2, y^2\}$. The vector I may be sorted in descending order such that the most prominent feature is placed in the beginning of the vector. Given a specific input vector $\{x, y\}$, it may be noted that one or more rules may be triggered by some function $f(x, y)$. In this exemplary embodiment, let $x \le 10$. This may trigger the function Sigmoid $(\beta_0+\beta_1 x+\beta_2 y+\beta_3 xy)$, which may result in the following localized feature importance vector, which serves as the basis for an explanation candidate whereby $E=\{\beta_1 x, \beta_2 y, \beta_3 xy\}$. It may be noted that different features may have different importance at a global and a local level; for example, in this particular exemplary embodiment, globally the feature x may be the most important, however, after evaluating the function locally it may be noted that y is the most important.

An exemplary XGAN system may construct explanation scaffolding from the output produced by the explainable architecture of the generator and/or the discriminator, and use it to illustrate the results to the interpreter to assist in understanding how the model arrived at a prediction. An interpreter may be the end-user or a component within the XGAN system. The underlying components of an explainable generative adversarial network may require model interpretation in order to update their states or internal parts of such model. It is further contemplated that a Candidate Explanation may be generated as a result of processing of the Explanation Scaffolding and can be used in the process of evaluation of the contents of the Explanation Scaffolding in some form of iterative process involving unsupervised or supervised learning and optimization. This iterative process may involve the original generating XGAN or a separate XGAN or another machine learning system.

Figure 16:
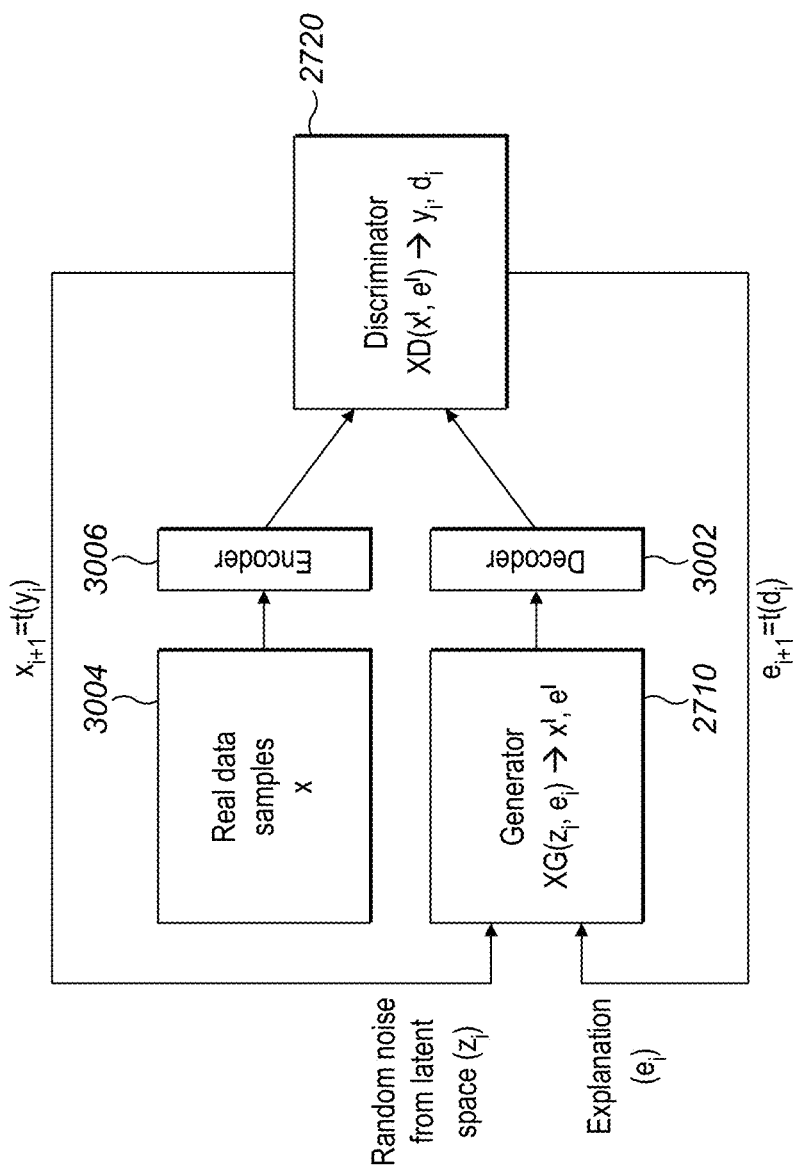
FIG. 16 is an exemplary illustration of an RNN model integrated in an XGAN architecture.

In an alternative embodiment, the explainable generator XG (z, e) may refer to a recurrent neural network (RNN) architecture, as shown in FIG. 16. An exemplary explainable generative adversarial network may be modeled after an Encoder-Decoder RNN, where XG(z, e) 2710, as shown in FIG. 16, computes a bottleneck vector and the decoder 3002 is utilized to generate samples. The generated samples may then be combined with the training dataset samples 3004. The training dataset samples 3004 may be optionally encoded by an encoder 3006. The training dataset samples 3004 or the encoded training dataset samples 3006 may be used as input to the discriminator XD(z, e) 2720, as shown in FIG. 16. The discriminator output may be used as input to the next iteration, such that $x_{i+1}=t(y_i)$ and $ei+1=t(di)$. The function t may denote a transformation function. The input parameters of the function t may include the output of the discriminator. The output values of the function t may include the noise z and additional parameters e.

An explainable generator XG(z) may have a convolutional neural network architecture (CNN) with the flatten layer connected to an explainable architecture x, where $x \in \{XAI, XNN, XTT, XRL, XSN, XMN, INN\}$ or logically equivalent or similar architectures. The feature attributions generated on the flatten layer, which may refer to the input dimensions to the explainable architecture x, may be implemented in a backmap to trace the feature attributions throughout convolutional layers and pooling layers. The backmap functionality may enable the model to highlight important features and bias on concepts learnt by an exemplary architecture.

In an exemplary embodiment, the explainable generator XG of an XGAN may include two inputs: the noise z and additional parameters e. The parameters e may be used to condition the class label of the generated image. In an exemplary embodiment, the explainable generator XG may learn how to generate realistic x-ray images containing the COVID-19 disease. The generator XG may highlight concepts, located in the CNN architecture of XG, that are found in COVID-19 x-ray images. These concepts may help medical professionals understand better the COVID-19 disease. It is further contemplated that Backmap, or a suitable network reversibility method, may be utilized in the XGAN implementation to reconstruct possible inputs when a lossless reconstruction is not possible. For example, an XGAN implementation with Backmap may attempt to reconstruct MRI images from partial readings to shorten the amount of processing time needed to get a clear scan.

Figure 19:
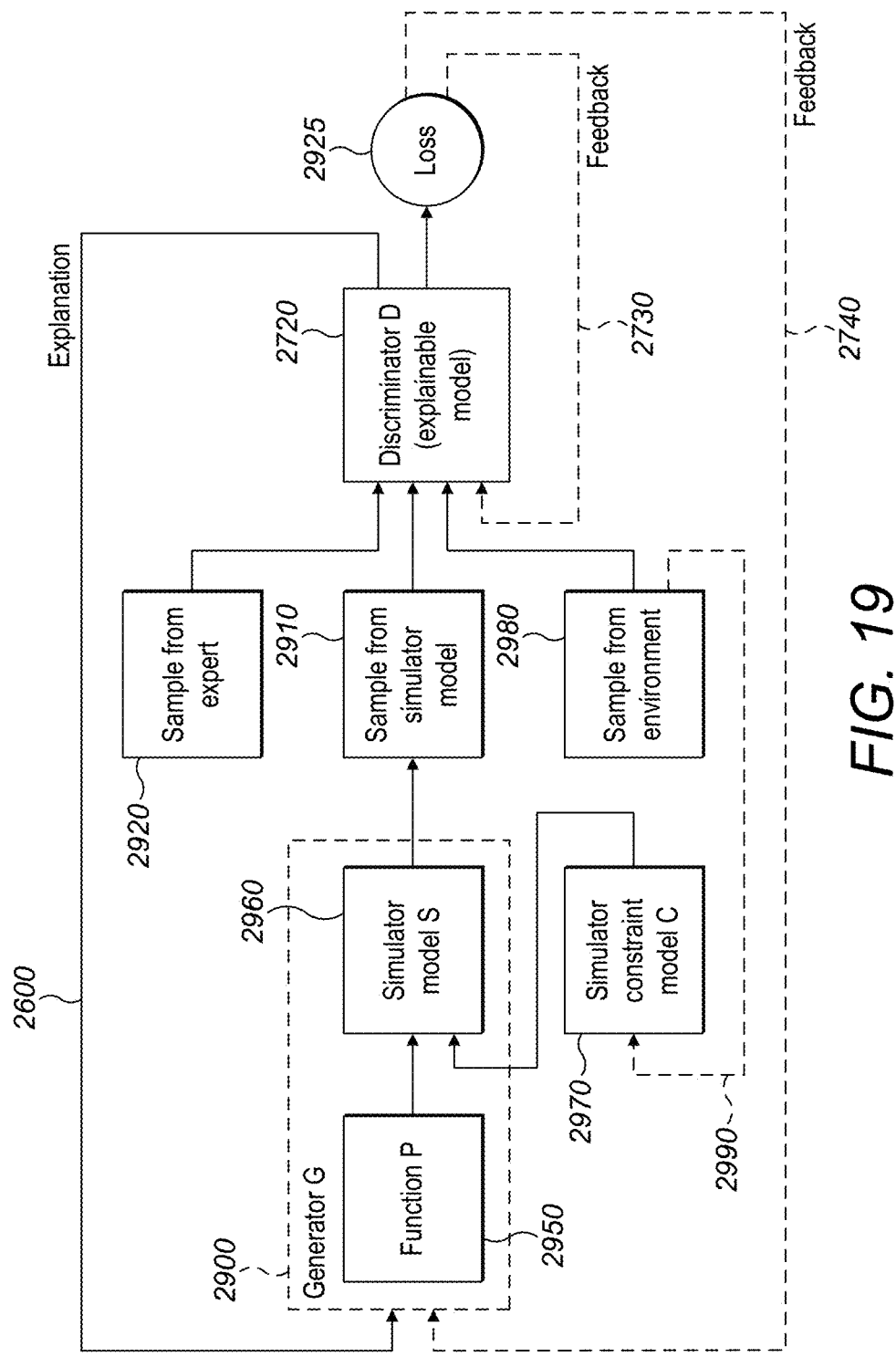
FIG. 19 is an exemplary illustration of an explainable generative adversarial imitation learning architecture.

The GAIL (Ho and Ermon, 2016) model serves as a template for non-explainable imitation-learning RL, and it does not address the use of explainability and how additional sources of information and knowledge, such as causal knowledge or neuro-symbolic information can be seamlessly incorporated. The Explainable Generative Adversarial Imitation Learning (XGAIL) model defined in this work, as shown in FIG. 19, makes a number of novel fundamental changes to the GAIL model that adds these capabilities. The XGAIL model also seamlessly integrates with XRL agents, allowing XRLs to utilize XGAN-like techniques efficiently while also utilizing statistical, causal, and symbolic knowledge, something that is impossible to do with a basic GAIL model. An exemplary XGAIL implementation may train the occupancy measure of a policy using an XGAN, while GAIL would use a black-box GAN to train the occupancy measure of a policy. XGAIL differs from GAIL by generating explanations in addition to the construction of a white-box model.

FIG. 19 illustrates a typical XGAIL embodiment. XGAIL replaces the GAN model with an XGAN that may generate multiple levels of explanations, which may include hierarchical partitioning information, internal coefficients of various models, and feature attributions of the input features which refer to the trajectories of the policy of the expert, and the explanations may be an output to the interpreter. Explanations may be in multiple formats, including but not limited to, a textual format for human readability, numeric formats which may represent the importance of the input dimensions or the bias in the given input dimensions, or any other suitable format. XGAIL also utilizes an explainable model for the Discriminator, while allowing the Generator to be either explainable or non-explainable. When XGAIL uses a non-explainable Generator, this may be classified as a grey-box XGAIL model. When XGAIL uses an explainable Generator, this may be classified as a white-box XGAIL model.

Continuing with the exemplary XGAIL embodiment in FIG. 19, the generated explanations from the explainable discriminator XD(z) 2720 may be used to provide feedback 2600 to a generator G 2900. G 2900 may include a function P 2950 that drives the simulator model S 2960. P may be a differentiable function when S includes a neural network or gradient-descent based models. P may also be differentiable or non-differentiable when S includes symbolic models. It is contemplated that S may be a black-box model, i.e., a normal GAN-style generator G, or an XGAN-style explainable generator XG(z). It is further contemplated that S may be a symbolic model that generates simulated or synthetic data via a set of rules, a formal language, neuro-symbolic model, logical model, or other form of symbolic model. It is further contemplated that S may be implemented using a hybrid model, such as that allowed via an ESM. S also receives constraint updates and priors from a simulator constraint model C 2970. C may represent a combination of statistical, causal, and symbolic knowledge. For example, C may implement statistical information such as joint distribution of variables or variable interactions. In another example, C may implement causal information as a causal model that can support associations, interventions, and counterfactuals. In another example, C may implement symbolic information as a set of rules, a formal language, neuro-symbolic model, logical model, or other form of symbolic model. In another example, C may implement a combination of pre-defined knowledge priors, physical world models such as physics simulation models, experimentally derived knowledge, knowledge bases, knowledge graphs, taxonomies, ontologies, rules, Bayesian estimates, or other suitable knowledge sources. In the exemplary embodiment presented in FIG. 19, the explainable discriminator XD(z) 2720 may take input from three main types of data sample sources: expert-derived samples 2920 (as happens in a GAIL model); or a sample from a simulator model 2910 which is generated from the Generator G 2900 (which fundamentally differs from the GAIL model in various ways due to the incorporation of causal and symbolic knowledge and the notion of explainability and constraints); or a sample from the RL/XRL agent environment 2980 (which is not contemplated in GAIL models). The environment derived sample 2980 may also be used in an environmental feedback loop 2990 to update the simulator constraint model C 2970 dynamically and adaptively as the RL/XRL agent encounters novelties in the environment. The explainable discriminator is also utilized in the determination of the loss value 2925.

XAEDs and/or XGANs may be implemented directly in hardware either using (i.) flexible architectures like FPGAs, or (ii.) more static architectures like ASICs, analogue/digital electronics, photo-electronics, or optical processors, or (iii.) neuromorphic architectures, spintronics, or memristors that may be more suited for the hardware implementation of connectionist models, or (iv.) quantum computing hardware. It may be further contemplated that hardware implementations of XAEDs and/or XGANs may possibly be linked to other hardware optimized explainable model variants to produce a dedicated hardware implementation that may only require low power and/or minimal or no network connection and that may be ideal for IoT deployments. XAEDs can also be a fully explainable replacement for existing hardware based and similar embedded systems that use a combination of decoders and/or encoders.

In an exemplary embodiment, a combination of an XGAN and/or XAED system may be implemented using FPGAs, which may be useful for applications involving high throughput and hardware acceleration advantage while maintaining flexibility that is usually associated with software implementations.

In an exemplary embodiment, a combination of an XGAN and/or XAED system may be implemented using ASICs, which may be useful for applications involving mass production of similar products. Such an implementation may have high performance and throughput, possibly at a cost of having less flexibility.

In an exemplary embodiment, a combination of an XGAN and/or XAED system may be implemented using discrete components, which may be useful for small size or compact XGANs and/or XAED system. Cost and robustness considerations may make this type of implementation attractive, for example, when high power systems are involved or when a simple XRL is needed for basic control or safety monitoring.

In another exemplary embodiment, a combination of an XGAN and/or XAED system may be implemented using neuromorphic hardware. Neuromorphic hardware also intertwines memory and processing in a similar manner to spintronics. Hardware neuromorphic XGAN and/or XAED system implementations may be highly efficient while having most of the advantages and flexibility similar to that of a general computing architecture without actually needing a general computing architecture. Neuromorphic XGAN and/or XAED system implementations may implement explainable models like XNNs and/or INNs efficiently, while enabling possible non-neural components of XGANs and/or XAEDs to be implemented efficiently too, for example, by utilizing the neuro-symbolic architecture of the XNN conditional network. Interpretable models, such as INNs, enable such architectures to be made understandable by presenting a model that can mostly be further presented to people in the form of rules and/or workflows. This surface representation form can be edited and then seamlessly reconverted back into the neural, connectionist format that is needed for neuromorphic hardware. Such an exemplary embodiment provides a practical solution for editing, adding, and deleting relevant information and consequently changing the behavior of neuromorphic devices in a controlled, reliable, and replicable manner.

In another exemplary embodiment, a combination of an XGAN and/or XAED system may be implemented on neuromorphic hardware that employ spiking neurons rather than the more common activation function-based neurons. Spiking neurons may increase the power efficiency and processing throughput very significantly, making some practical applications feasible that would otherwise be unfeasible with non-spiking neurons.

In another exemplary embodiment, a combination of an XGAN and/or XAED system may be implemented using spintronics or memristors. Spintronics intertwine memory and computing components leading to a potentially more efficient hardware implementation since there does not need to be much, if any, transfer of memory values, weights, etc. during operation. Memristors offer similar advantages and have the advantage of being non-volatile. Spintronic and/or memristor implementations may have similar characteristics to an FPGA implementation if they are reprogrammable. Non-reprogrammable spintronics or memristors may have similar characteristics to ASICs. XGAN and/or XAED systems can be efficiently implemented using spintronics or memristors by converting all the different layers and neurons in any connectionist-based part of the XGAN and/or XAED system together with any state-machine or tabular-based part of the XGAN and/or XAED system to a spintronic or memristor circuit. Spintronic implementations may be particularly efficient in practice due to the conflation of memory and processing that is available in a spintronic circuit. Memristor implementations may be particularly power efficient as their non-volatile weight storage makes it possible to aggressively switch off part or all of a memristor based system during operation. Faster data access and the elimination or reduction of having computationally expensive data transfer requests over a data bus can significantly improve the performance of such an implementation.

In another exemplary embodiment, a combination of an XGAN and/or XAED system may be implemented using a quantum processing system. It is contemplated that an XGAN and/or XAED system implemented on a quantum processing system will have characteristics that are similar to classical XGAN and/or XAED models with the addition of quantum specific extensions. For example, such an extension may allow for the specification of quantum annealing effects and their correct interpretation. In another example, an extension may allow for the correct interpretation of multiple qubit states, qubit basis states, mixed states, Ancilla bits, and other relevant quantum effects due to entanglement and/or decoherence. In another example, an extension may allow for the introduction of quantum logic specific operators and/or hardware logic gates within an XNN, such as quantum logic gates like CNOT (Controlled-NOT), CSWAP (Controlled-Swap or Fredkin gate), XX (Ising Coupling Gate XX), YY (Ising Coupling Gate YY), ZZ (Ising Coupling Gate ZZ) gates, Pauli gates, Hadamard gates, Toffoli gates and other relevant quantum logic operations that may be combined serially or in parallel. Such quantum-logic gates (or quantum gates) operate on a number of qubits, acting as the quantum analogy of classical logic gates. The XX, YY, ZZ designation of the Ising gates are related to the Pauli X, Y, Z matrices which are used to describe the interaction of a particle's spin with an external electromagnetic field. Furthering these examples, such quantum specific extensions may be implemented in various parts of the XGAN and/or XAED based system, for example by having quantum extended versions of conditions, events, triggers, and actions. It is further contemplated that such quantum extended versions of an XGAN and/or XAED system may take advantage of quantum effects, for example, to execute multiple actions, or evaluate multiple conditions, or evaluate large systems of constraints in significantly fewer processing steps needed than possible on a classic processing implementation. In an exemplary embodiment, an XGAN and/or XAED system implemented on quantum computing hardware, may utilize suitable quantum algorithms, such as those based on quantum Fourier transforms, amplitude amplification, quantum walks and so on. In an exemplary XGAN and/or XAED system embodiment on quantum devices, the Bernstein-Vazirani, Simon's algorithm or the Deutsch-Jozsa algorithm may be utilized to predict and refine the boundary conditions of the XGAN and/or XAED system, while also potentially speeding up the encoding-decoding aspect. In another exemplary quantum embodiment, Shor's algorithm, Quantum Phase estimation algorithm, Grover's algorithm, Quantum Counting, Quantum Hamiltonian NAND trees, or the HHL algorithm may be used to speed up the constraint, condition, event, and trigger parts of an XGAN and/or XAED system integrated with a Behavioral Model (BM). In another exemplary embodiment on quantum devices, a hybrid solution may be utilized, such as the QAOA algorithm, VQE eingensolver, CQE eingensolver, and quantum matrix inversion to speed up part of the processes involved, for example by using Gaussian estimation processes, or linear system of equations solvers that utilize quantum processing to give faster results both during XGAN and/or XAED system training and when operating normally in the environment.

Another exemplary embodiment is to utilize a combination of XAEDs and XGANs within an Explanation and Interpretation Generation System (EIGS) where they can perform various roles, such as part of the Explainer, Filter and/or Interpreter in the EIGS Explanation-Filter-Interface (EFI) model.

In a further exemplary embodiment, an XGAN and an XAED may be incorporated within a workflow system that reads from the XGAN or the XAED and writes back to the XGAN or XAED respectively, including both processing data and event data. It is further contemplated that the XGAN and the XAED and the workflow combination may be further integrated within a Robotic Process Automation (RPA) system, Decision Support System (DSS) or a Data Lake system.

In an exemplary embodiment, a combination of an XAED and/or XGAN system may be used to do constant monitoring of AI models to detect anomalous behavior, detect instances of data drift and out-of-distribution (OOD) instances, detect abnormal deviations from nominal operational cycles, analyze and assess the behavior of AI models under OOD and anomalous instances, variation, deviation, performance and resource usage monitoring, phase-space, and other related monitoring activities. It is further contemplated that the XAED system component can provide feedback into an XGAN system with an XGAIL model to create experience replay type of learning and simulation examples to the XAED/XGAN system.

It is further contemplated that XAED and/or XGAN actions, objective metrics, conditions, constraints, actions, triggers, and events may utilize a combination of abductive, inductive, deductive logic in conjunction with causal logic. Using inductive logic, XAEDs and/or XGANs may predict future behavior based on generalized rules and knowledge that may have been learnt fully automatically. Using deductive logic, XAEDs and/or XGANs may predict behavior according to a combination of one or more conditions or constraints. Using abductive logic, XAEDs and/or XGANs may retrofit an observed scenario to a known set of possible states in the XAED and/or XGAN system or be able to explain the currently observed behavior in a reasonably acceptable manner. Abductive logic may also be useful in practical implementations of XAED and/or XGAN-based diagnostic systems and can be used to aid in the diagnosis and troubleshooting of AI systems using behavioral monitoring and predictive data. Abductive logic may also be useful in the creation of XAED and/or XGAN-based explanation narratives that fit an observed state, while inductive and deductive logic may be useful in the creation of XAED and/or XGAN-based explanation narratives in general, together with predictive-like narratives. Abductive logic may be useful in situations where the environment provides partial observability.

In an exemplary embodiment, a combination of an XAED and/or XGAN system may link neuro-symbolic conditional constraint with its previous historic rate of activations in order to constrain the rate of trigger activation. A neuro-symbolic constraint may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis. Neuro-symbolic conditional constraints may also be implemented in form of a data structure that references the different features and variables accessible to the explainable model and any associated taxonomies, ontologies, and causal models. Neuro-symbolic constraints may also be implemented in the form of knowledge graph networks.

In an exemplary embodiment, a combination of an XAED and/or XGAN system may be integrated with a combination of an Explainable Machine Learning System, Interpretable Machine Learning System, Explainer, Filter, Interpreter, Explanation Scaffolding, and Interpretation Scaffolding within the context of an Explanation and Interpretation Generation System (EIGS) and/or the Explanation-Filter-Interpretation (EFI) model.

In an exemplary embodiment, a combination of an XAED and/or XGAN system may be used to input, output and process Explanation Structure Models (ESMs) together with an optional Explanation Output Template (EOT) to create Machine and Human Readable Explanations for use in different applications, including EIGS-like applications.

A named reference label may be assigned to particular components within an explainable model in an XGAN and/or XAED system. Named reference labels may be descriptive in nature and may also contain additional metadata and links to external taxonomies, ontologies, and models. A named reference label may include symbolic expressions and/or formulas of the form of: Conjunctive Normal Form (CNF) rules Boolean logic, first order logic, second order logic, propositional logic, predicate logic, modal logic, probabilistic logic, many-valued logic, fuzzy logic, intuitionistic logic, non-monotonic logic, non-reflexive logic, quantum logic, paraconsistent logic or other suitable type of logical system for the expression of logical—or similar statements to provide an explanation of the set or sequence of decisions that resulted in the execution of the current component, in the XAED and/or XGAN, which we refer to as the path trace. An "activation path" may be defined as a data flow path followed by an AI model, starting from a particular input, and ending in a particular output prediction. The path trace is set or sequence of decisions, nodes, transitions, or applicable description structures for the particular AI model describing the activation path. Named references may be used in safety related constraints to ensure easier and more reliable identification by humans, especially in potentially critical and stressful situations where human attention span may be severely taxed or limited.

In another exemplary embodiment, the same invariance of named reference labels under dynamical processes may be utilized by an XAED and/or XGAN system to generate stable, long-term explanations of the dynamics occurring within an AI model without having to recode knowledge or retrain explanatory methods with each run of the dynamical process.

In an exemplary embodiment, a combination of an XAED and/or XGAN system may utilize rules. Rules may represent encoding and decoding relations within an XAED and/or XGAN, where they are used to encode and decode information and to generate and discriminate between samples respectively. An exemplary rule representation format may include a system of Disjunctive Normal Form (DNF) rules or other logical alternatives, like Conjunctive Normal Form (CNF) rules, Boolean logic, first order logic, second order logic, propositional logic, predicate logic, modal logic, probabilistic logic, many-valued logic, fuzzy logic, intuitionistic logic, non-monotonic logic, non-reflexive logic, quantum logic, paraconsistent logic or other suitable type of logical system for the expression of logical or similar statements.

Figure 18:
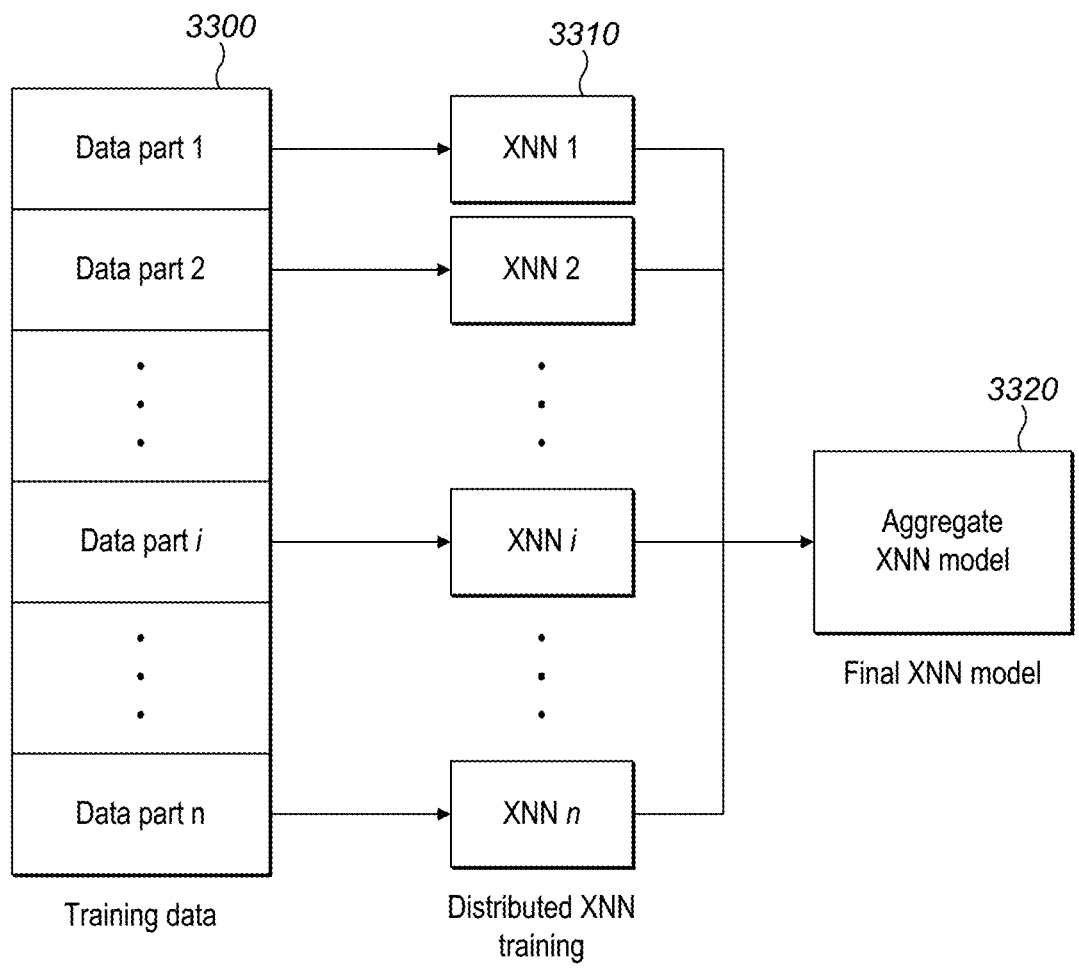
FIG. 18 is an exemplary illustration of a high-level architecture of a distributed XNN training system.

A distributed explainable architecture DEA, as shown in FIG. 18, may be used for an explainable architecture component in an XGAN and/or XAED model. A distributed explainable architecture DEA may contain multiple explainable architectures $DEA_x$, such that $DEA_x = \{x_1, x_2, \ldots, x_n\}$ and $x_i \in \{XAI, XNN, XTT, XRL, XSN, XMN, INN\}$ or logically equivalent or similar ensemble architectures, where these architectures are processed in parallel. FIG. 18 illustrates a high-level architecture of a distributed training system, where DEA, refers to the XNN architectures 3310.

A DEA may split the dataset 3300 into multiple subsets 3310 of data in order to train the explainable architectures $DEA_x$. The models trained in a distributed framework DEA are aggregated 3320 during the training phase by calculating the average (or weighted average) from the parallel models. The aggregate model may be formed based directly on the weights of the model, rather than from the result of the individual models. An exemplary distributed explainable architecture DEA may be useful for large datasets where the training data cannot fit in the CPU/GPU memory of a single machine.

A DEA may include hybrid models, such that the models in the architecture are a mix of x, where $x \in \{XAI, XNN, XTT, XRL, XSN, XMN, INN\}$ or logically equivalent or similar architectures. An exemplary embodiment may implement multiple different models. In an exemplary embodiment, one data part may implement an XNN while another data part of the same system may implement an XAI. The models may then be combined to create an aggregate model. The aggregate model may be equal to x, where $x \in \{XAI, XNN, XTT, XRL, XSN, XMN, INN\}$ or logically equivalent or similar architectures or may be a hybrid model implementing multiple different models.

A DEA may incorporate multiple independent models where one model, once trained, can work independently without the need to rely on the full distributed architecture, which is optimized primarily for training purposes. The models in a distributed explainable architecture DEA may be a variant of the explainable architectures x. Variants may include convolutional XNNs (CNN-XNNs), predictive XNNs (PR-XNNs), text XTTs (T-XTTs), and the like.

In an exemplary embodiment, an XGAN and/or XAED system will use a suitable computational and knowledge representation structure as the basis of its constraint and predictive logic implementation. Such a suitable structure may be a Resource Description Framework (RDF) tree, RDF graph, or other suitable form of graph structure. It is further contemplated that a hypergraph structure or a simplicial complex may be used in a practical XGAN and/or XAED implementation.

In an exemplary embodiment, an XGAN and/or XAED system may implement audit log functionality. An exemplary application of such XGAN and/or XAED audit log information is in the creation of decision logs and path traces that clearly illustrate the flow, interactions, and behavior of the XGAN and/or XAED and its conditions, events, triggers and actions and overall dynamics. It is contemplated that path traces may be implemented in expert systems and rule-based systems as an annotated sequence of rules that have been triggered and executed. It is further contemplated that path traces may be implemented in workflow systems as an annotated sequence of workflow nodes and paths that have been executed by the workflow engine. The path trace can be used to illustrate the precise sequence and behavior of the XGAN and/or XAED and may be implemented and configured to display nearest neighbors along the path that may be of interest to the user.

It is further contemplated that an XGAN and/or XAED may utilize its own audit system log that can be stored in a system of record, distributed ledger technology (DLT), database, or some other suitable system in a tamper-proof and traceable manner. Such audit information may be either stored in an independent system that is separate from the associated AI model or share the same audit system used by its associated AI model.

In an exemplary embodiment, an XGAN and/or XAED system may be implemented and verified by on a combination of systems based on one or more of the Temporal Logic of Actions, Abstract Machine Notation, Petri Nets, Computation Tree Logic, and other suitable implementation methods that can formally represent modal logics, intuitionistic logics, and/or relational semantics, including but not limited to Kripke semantics and/or Alexandrov topologies.

In an exemplary embodiment, a combination of XGAN and/or XAED system may utilize anchor terms. A number of nodes and edges, and other events, triggers, constraints, and actions in an XGAN and/or XAED may be deemed to be important or critical for the particular application domain. Such importance may be determined either by the application or usage context, or via an external third party, such as a regulatory or legal authority or an industry standard making body, that imposes certain mandatory constraints. These type of important or critical constraints may be referred to as anchor terms, anchor variables, anchor nodes, anchor edges, anchor events, anchor triggers, anchor constraints and anchor actions, respectively. Such anchor components are analogous to the anchor terms within Explanation Structure Models (ESMs). Anchor terms may also be assigned a named reference label.

In another exemplary embodiment, a combination of XGAN and/or XAED system may be incorporated within a suitable risk identification, assessment, and mitigation framework, such as that proposed by the ISO27001 model. It is also contemplated that a combination of an XGAN and/or XAED system may be incorporated within an Identify—Assess—Recommend—Resolve (IAR) framework that utilizes different metrics to identify issues, then related metrics to assess the severity of the identified issue, followed by ranked and/or scored recommendations and finally coupled with a decision to execute such recommendation as part of a resolution plan. It is further contemplated that such a combination of an XGAN and/or XAED system may further incorporate a Goal-Plan-Action (GPA) system and/or Decision Support System (DSS) with the IAR framework. It is further contemplated that various risk metrics, such as bias, financial impact, contractual delays and other metrics are incorporated within such an exemplary embodiment.

In another exemplary embodiment, a combination of an XGAN and/or XAED system may be used in conjunction with AI models that process sequence data. Sequence data may include a number of data points which contain feature data in various sequential formats including, but not limited to: 2D data, 3D data, multi-dimensional data arrays, transactional data, time series, digitized samples, sensor data, image data, hyper-spectral data, natural language text, video data, audio data, haptic data, LIDAR data, RADAR data, SONAR data, and the like. Data points may have one or more associated labels which may indicate the output value or classification for a specific data point or a continuous or non-continuous interval of data points. Data point sequences may result from an internal and/or external process that may output a combination of synthetic data points, perturbed data, sampled data, or transformed data.

In an exemplary embodiment, a combination of quantization and pruning methods may be applied during the XAED and/or XGAN processing to increase performance and possibly reduce implementation size, especially on resource constrained hardware. It is further contemplated that some form of instability reduction technique, such as using Ordinary Differential Equation (ODE) solvers, such as the one presented in (Qin et al., 2020) may be applied to partially counteract any detrimental effects of quantization on the XAED and/or XGAN accuracy and reduce instability during training.

In an exemplary embodiment, a combination of XGAN and/or XAED system may be used as the basis or part of a practical data privacy preserving AI system implementation. Data privacy may be violated intentionally or unintentionally by AI systems in a number of scenarios: (i.) personal data from training datasets unintentionally incorporated in AI models; (ii.) personal data can be re-extracted or re-created by analyzing the model answers repeatedly; (iii.) personal data of certain uniquely identifiable groups may end up at a higher risk of identification; (iv.) model inversion and membership inference techniques, that can associate model data via a unique key or signature; (v.) other sources of information, such as public data sources, which may be combined with private information, may re-create or otherwise identify private information. The main data privacy preserving solutions for AI can be classified under four categories: (i.) differential privacy; (ii.) secure multi-party computation; (iii.) federated learning; (iv.) homomorphic encryption. Exemplary embodiments of XGAN or the XAED based systems may enable practical implementations under all four categories.

In an exemplary privacy preserving solution (i.), differential privacy, the introduction of noise in the training data or some other suitable means of obfuscation, may be used to generate a controllable amount of privacy through a noise factor or ratio, in the XGAN and/or XAED system. The noise level may be a variable which the user may be able to supply or edit, where the noise level may be implemented as a constraint and/or objective. In privacy preserving solution (ii.), secure multi-party computation (SMPC) may be used to obtain a correct answer while concealing partial information about data and may simultaneously compute the answer using data from one or more sources. Exemplary embodiments of XGAN and/or XAED system and explainable models may extend SMPC protocols to apply to explanation generation apart from answer output. It is further contemplated that exemplary embodiments of an XGAN and/or XAED system can be analyzed and tested formally for security and trust building purposes without revealing any private information. A secure enclave may also be used to decrypt the data in a protected space within the hardware processor, limiting the possibility that other parts of the system can access such data in clear text. An end-to-end hardware implementation of a combination of an XGAN and/or XAED system with a secure enclave may be rather resilient to most forms of data attacks. In privacy preserving solution (iii.), federated learning, an XGAN and/or XAED system may be distributed across various decentralized devices that hold only local data samples. The local data samples are not shared with other devices, thus limiting, but not completely eliminating, the privacy risk involved, and may be particularly suitable for IoT or edge computing applications where messaging options are limited or constrained by the network topology, such as in a mesh network. In privacy preserving solution (iv.), homomorphic encryption, or homomorphic computing may be used to allow computation on encrypted data without either decrypting the data and also, optionally, using encrypted explainable models. In an exemplary embodiment of an XGAN and/or XAED system using homomorphically encrypted data and a homomorphically encrypted XNN, utilizing the CKKS protocol, a secret key and a public key are generated. The public key is used for encryption and can be shared, while the private key is used for decryption and must be kept secret, for example, in a secure hardware enclave or similar implementation solution.

An XAED and/or XGAN system may utilize generated structured explanations based on what-if, what-if-not, counterfactual, but-for, and conditional scenarios to generate explained strategies and scenario-based explanations that correspond to the outcome of applying such scenarios to the XAED and/or XGAN system input, where one or more hypothetical target outcomes are selected as part of the scenario modelling. Such scenario-based explanations are also known as contrastive explanations or comparative explanations, depending on whether the target scenario outcome is contrastive or comparative in nature, respectively. It is contemplated that in such a scenario-based explanation generation application, an XAED and/or XGAN system may associate constraints with the scenario being examined, objective costs with the feature difficulty/attainability/severity, and associate actions as output targets with domain specific and scenario-specific actions. In a further exemplary embodiment, an XAED and/or XGAN system may be implemented together with an XRL agent to provide additional information regarding the policy, costs, and rewards and/or also to provide additional training examples for the XRL agent. In an exemplary embodiment, an XAI model such as XNNs may be used to predict the outcome of a loan application. A loan application may be accepted or rejected for various reasons, such as the total income, the current occupation, age, total net worth, and other factors. The system user may want suggestions on how to change the outcome of the loan application. For example, in the case of a rejected loan application, the system user may want to know what combination of items in the input needs to change for the status of an application to change from rejected to approved. It may be contemplated that only a sub-set of all input variables, features and feature interactions may need to be changed. One or more costs may be associated with each variable, corresponding to some suitable metric for each type of cost. For example, bias protected classes, such as gender or race, may have a very high cost associated or marked as impossible to reach outright (i.e., an illegal outcome state). In another example, a high cost may be associated with strategy actions that are irreversible. Other variables such as current income may have lower cost, than the total net worth variable. The cost of an action may be linear or non-linear and may contain dependent or independent variables which impact the total cost. Missing data may also have a special cost associated with it, enabling the XAED and/or XGAN system agent to handle missing data appropriately, with or without corrective measures. Explanation data such as feature importance or coefficients provide an exact measurement of the expected reward or cost for a given action. Exogenous and endogenous variables and causal models may be used to estimate the total cost of an action, including any specific association, intervention or counterfactual rules that need to be applied. An XAED and/or XGAN system may be trained to learn the suggested actions for a given user with a specific context, i.e., suggest possible changes in variables, which lead to a change in outcome while minimizing the total cost of actions. It may also be contemplated the suggested actions may contain some form of sequence, which lead to the desired goal. It is further contemplated that a nearest-neighbor method is utilized in conjunction with such scenario-based XAED and/or XGAN system explanations to provide (suitably anonymized) actual examples of applications that have had the desired scenario outcome (exemplars) or a hypothetical average of such an application (prototype). Such nearest-neighbor methods may take advantage of partition hierarchy structures within the explainable model, to generate examples from the same partition, or from a nearby partition or from a partition that is further away from the current partition. It is further contemplated that possible changes in variables are ranked and prioritized by some suitable system and presented to the user or to an automated process in the form of an Identify-Assess-Recommend-Resolve (IAR) framework. It may be further contemplated that alternative optimization methods may also be used to generate such scenario-based explanations such as Multiple Objective Optimization (MOO), Pareto Front Methods, Particle Swarm Optimization (PSO), Genetic Algorithms (GA), Bayesian Optimization, Evolutionary Strategies, Gradient Descent techniques and Monte Carlo Simulation (MCS). It is further contemplated that the encoding-decoding information for the XAED and/or XGAN system are fully or partially linked to attribution values and other data stored in an Explanation Structure Model (ESM).

In an exemplary embodiment, an XAED and/or XGAN system may be implemented together with an XRL agent to generate realistic environmental simulations and/or provide experience learning data samples for the XRL agent. It is further contemplated that such an exemplary embodiment may be utilized in the creation of virtual reality simulations, augmented reality simulations, virtual collaboration spaces, and metaverses. It is further contemplated that such generated data samples may be tagged with some secure traceable digital code, distributed ledger entry or non-fungible token (NFT).

In an exemplary embodiment, an XAED and/or XGAN system may implement an adaptive education system that utilizes and generates adaptive education content that is tailored and customized towards different student learning rates. It is contemplated that such an exemplary XAED and/or XGAN system may be implemented in conjunction with an augmented reality, virtual reality, video game environment or metaverse system to provide explainable educational recommendations, actions and assessments. It is further contemplated that such an exemplary an XAED and/or XGAN system may utilize a behavioural framework (BM) to provide a safe environment for its users. It is further contemplated that such an exemplary embodiment may be extended to other application areas, such as industrial task training, interactive job training and instructional systems.

In an exemplary embodiment, the named reference labels themselves may also be used by a suitable model discovery system or model optimization system, such as an exemplary AutoXAI system (that in this case, may discover and optimize an XAED and/or XGAN system architecture), to generate human-friendly explanations of an XAED and/or XGAN system-related or other dynamical processes that may be otherwise very difficult to explain. It may be further contemplated, the named reference labels may remain invariant throughout such dynamical processes, even though the precise location, connection and relationship between the part and the whole of the relevant named component may change. Such invariance under dynamical processes makes named reference labels an ideal component for use within explanations.

It is further contemplated that such an exemplary AutoXAI system may utilize a formal language or some other suitable means to represent a computational graph for the state knowledge stored within the XAED and/or XGAN system, together with more dynamic changes like the Generator function in XGANs or the autoencoder-decoder states in XAEDs. This allows the AutoXAI system to adapt the XAED and/or XGAN system performance to one or more specific application domains or tasks and provides a practical solution to the incorporation of meta-learning systems within an XAED and/or XGAN system, which while common in reinforcement learning systems is an unobvious use for XAEDs/XGANs. Such meta-learning systems may also provide a practical solution towards the initial incorporation of human process knowledge which is subsequently refined during AutoXAI model discovery.

In an exemplary embodiment, an XAED and/or XGAN system utilizing an explainable model such as an XNN, INN or XTT may have multiple inputs corresponding to one or more tasks that are associated with one or more input features and have multiple outputs corresponding to the outputs for those tasks. The semantic notion of tasks in such context is merely implemented by designating some input features as task identifiers and task meta-data input features without needing any change in the XAED/XGAN system structure itself. The hierarchical partition structure in the explainable model forming part of the XAED and/or XGAN system, which may be a tree, graph, hypergraph, or simplicial complex structure, allows for crossover between different knowledge learnt for the different tasks to occur efficiently. Such crossover occurs within the XAED/XGAN prediction network, which caters for feature interactions within the hierarchical partition structure. The XAED/XGAN conditional network may be used to select, orchestrate and multiplex the correct path trace through the partition structure linking the task, its associated inputs, and associated outputs. It is contemplated that a denser or sparse XAED/XGAN explainable model may be utilized to implement parts of the partition structure in an energy efficient manner. It is further contemplated that a distributed XAED/XGAN or a DEA may be used to implement parts of the partition structure in a practical manner. It is further contemplated that an XAED and/or XGAN system implemented with an XTT explainable model may additionally utilize its attention mechanism to help generalize and optimize multiple task-input-output crossover and transfer learning.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A non-transitory computer-readable medium comprising computer program code that, when executed by a computer comprising a processor and a memory, is configured to configure the computer to perform steps for providing an explainable model comprising one or more of an explainable autoencoder and an explainable generative adversarial network, the steps comprising:

forming a first model and a second model; wherein one or more of the first model and second model is a whitebox explainable model comprising a first feature importance vector having a global level of explainability; and generating, with the first model and the second model, simultaneously in a single feed-forward step, one or more rules, a plurality of feature attributions, and one or more explanations, by steps comprising:

generating synthetic data from the first model and inputting the synthetic data and/or an input dataset to the second model, and forming the explainable model, the explainable model comprising one or more of the explainable autoencoder and the explainable generative adversarial network based on an output of the second model associated with the synthetic data and/or the input dataset, wherein forming the explainable model comprises identifying a plurality of partitions associated with the synthetic data and/or the input dataset, wherein the partitions are arranged in a hierarchy, each partition in the hierarchy having a predetermined proximity to each other partition in the hierarchy, said predetermined proximity defined by the hierarchy, wherein each partition in the hierarchy comprises a second feature importance vector having an intermediate level of explainability;

extracting partition information from the explainable model and identifying the plurality of feature attributions associated with a plurality of features of the input dataset; and generating the one or more explanations based on the partition information and the plurality of feature attributions; and terminating processing associated with generating the one or more rules, the plurality of feature attributions, and the one or more explanations, and outputting the one or more explanations, following the single feed-forward step.

2. The non-transitory computer-readable medium according to claim 1, wherein the input dataset is input into the second model, wherein the input dataset comprises an output of a deep learning system.

3. The non-transitory computer-readable medium according to claim 2, wherein the deep learning system is one of a convolutional neural network (CNN) or an explainable convolutional neural network (CNN-XNN), and wherein the output of the deep learning system is an image.

4. The non-transitory computer-readable medium according to claim 3, wherein the image is an X-ray image, and wherein identifying the plurality of feature attributions associated with a plurality of features of the input dataset comprises highlighting one or more pixels in the image.

5. The non-transitory computer-readable medium according to claim 4, further comprising identifying a reconstruction loss in the X-ray image, comparing the reconstruction loss to a threshold, and identifying an anomaly based on comparison of the reconstruction loss to the threshold.

6. The non-transitory computer-readable medium according to claim 1, wherein the input dataset is a plurality of partial medical readings, and wherein the steps comprise applying at least one network reversibility method to reconstruct a medical image from the plurality of partial medical readings.

7. The non-transitory computer-readable medium according to claim 1, wherein the input dataset comprises a medical image and at least one additional feature, and wherein the steps comprise encoding the medical image into a latent space, and, after encoding the medical image into the latent space, connecting the at least one additional feature.

8. The non-transitory computer-readable medium according to claim 7, wherein the at least one additional feature is human knowledge and wherein the steps further comprise injecting human knowledge into the explainable model, wherein the human knowledge creates or alters the one or more rules or one or more of the plurality of partitions, and wherein the created or altered one or more rules or one or more of the plurality of partitions is static and unchangeable by the explainable model, and wherein the human knowledge is expressed as a knowledge graph comprising nodes that describe human defined entities, and edges that describe a relationship between nodes; and wherein each node in the knowledge graph comprises one or more taxonomy identifiers that contribute to a classification of knowledge in the knowledge graph, wherein the knowledge graph comprises multiple taxonomies; and wherein one or more taxonomy identifiers are configured to fuse a plurality of knowledge graphs together.

9. The non-transitory computer-readable medium according to claim 1, wherein the input dataset comprises a video comprising a plurality of images arranged in a sequence, and wherein identifying the plurality of feature attributions associated with a plurality of features of the input dataset comprises highlighting one or more pixels in each image in the sequence.

10. The non-transitory computer-readable medium according to claim 1, wherein the input dataset comprises a loan application, wherein the one or more explanations comprise attributes of the loan application contributing to acceptance or rejection, and wherein generating the one or more explanations comprises determining that at least one attribute of the loan application is associated with an illegal outcome state.

11. The non-transitory computer-readable medium according to claim 1, wherein the explainable model is configured to be used as the basis or part of a practical data privacy preserving artificial intelligence (AI) system implementation, including at least one of: a differential privacy solution, a secure multi-party computation solution, a federated learning solution, and a homomorphic encryption solution.

12. The non-transitory computer-readable medium according to claim 11, wherein the explainable model includes the differential privacy solution, comprising a step of introducing noise in training data governed by a predetermined noise factor.

13. The non-transitory computer-readable medium according to claim 11, wherein the explainable model includes the secure multi-party computation solution, comprising a step of performing a portion of computation steps in a protected space.

14. The non-transitory computer-readable medium according to claim 11, wherein the explainable model includes the federated learning solution, comprising a step of executing the explainable model across a plurality of devices, each holding local data samples not shared with each other device in the plurality of devices.

15. The non-transitory computer-readable medium according to claim 11, wherein the explainable model includes the homomorphic encryption solution, comprising a step of executing one or more computations directly on encrypted data.

16. The non-transitory computer-readable medium according to claim 1, further comprising a step of sending the one or more explanations to a workflow system, and receiving feedback data from the workflow system and updating the explainable autoencoder based on the feedback data.

17. The non-transitory computer-readable medium according to claim 16, wherein the workflow system is a component of a Robotic Process Automation (RPA) system.

18. The non-transitory computer-readable medium according to claim 17, wherein the input dataset comprises sequence data comprising sensing data including at least one of LIDAR data, RADAR data, SONAR data, or sensor data.

19. The non-transitory computer-readable medium according to claim 16, wherein the workflow system is a component of a Decision Support System (DSS).

20. A computer apparatus comprising a processor and a memory, the memory comprising program code configured to configure the processor to perform steps for providing an explainable model comprising one or more of an explainable autoencoder and an explainable generative adversarial network, the steps comprising:

forming a first model and a second model; wherein one or more of the first model and second model is a white-box explainable model comprising a first feature importance vector having a global level of explainability; and generating, with the first model and the second model, simultaneously in a single feed-forward step, one or more rules, a plurality of feature attributions, and one or more explanations, by steps comprising:

generating synthetic data from the first model and inputting the synthetic data and/or an input dataset to the second model, and forming the explainable model, the explainable model comprising one or more of the explainable autoencoder and the explainable generative adversarial network based on an output of the second model associated with the synthetic data and/or the input dataset, wherein forming the explainable model comprises identifying a plurality of partitions associated with the synthetic data and/or the input dataset, wherein the partitions are arranged in a hierarchy, each partition in the hierarchy having a predetermined proximity to each other partition in the hierarchy, said predetermined proximity defined by the hierarchy, wherein each partition in the hierarchy comprises a second feature importance vector having an intermediate level of explainability;

extracting partition information from the explainable model and identifying the plurality of feature attributions associated with a plurality of features of the input dataset; and generating the one or more explanations based on the partition information and the plurality of feature attributions; and terminating processing associated with generating the one or more rules, the plurality of feature attributions, and the one or more explanations, and outputting the one or more explanations, following the single feed-forward step.

* * * * *